(12) United States Patent
Klessig et al.

(10) Patent No.: US 8,953,486 B2
(45) Date of Patent: Feb. 10, 2015

(54) GLOBAL AUTO-CONFIGURATION OF NETWORK DEVICES CONNECTED TO MULTIPOINT VIRTUAL CONNECTIONS

(75) Inventors: Robert W. Klessig, Los Altos Hills, CA (US); Cedric H. Druce, Basking Ridge, NJ (US)

(73) Assignee: Cisco Technology, Inc., San Jose, CA (US)

( * ) Notice: Subject to any disclaimer, the term of this patent is extended or adjusted under 35 U.S.C. 154(b) by 481 days.

(21) Appl. No.: 11/937,819

(22) Filed: Nov. 9, 2007

(65) Prior Publication Data
US 2009/0122718 A1      May 14, 2009

(51) Int. Cl.
*H04L 12/28*    (2006.01)
*H04L 12/46*    (2006.01)

(52) U.S. Cl.
CPC .......... *H04L 12/2854* (2013.01); *H04L 12/462* (2013.01)
USPC ....................................................... 370/254

(58) Field of Classification Search
None
See application file for complete search history.

(56) References Cited

U.S. PATENT DOCUMENTS

| | | | |
|---|---|---|---|
| 5,502,816 A | 3/1996 | Gawlick et al. ................ 709/227 |
| 5,812,552 A * | 9/1998 | Arora et al. ................ 370/395.53 |
| 5,930,259 A | 7/1999 | Katsube et al. ................ 370/409 |
| 6,011,782 A | 1/2000 | DeSimone et al. ........... 370/260 |
| 6,061,334 A * | 5/2000 | Berlovitch et al. ........... 370/255 |
| 6,314,103 B1 | 11/2001 | Medhat et al. ............. 370/395.2 |
| 6,400,730 B1 | 6/2002 | Latif et al. .................... 370/466 |
| 6,490,622 B1 | 12/2002 | Nagami et al. ................ 709/225 |
| 6,631,134 B1 | 10/2003 | Zadikian et al. ......... 370/395.21 |
| 6,697,338 B1 * | 2/2004 | Breitbart et al. .............. 370/254 |
| 6,757,286 B1 * | 6/2004 | Stone ........................ 370/395.53 |
| 6,765,914 B1 | 7/2004 | Jain et al. ................. 370/395.31 |
| 6,801,498 B1 | 10/2004 | Kamiya ........................ 370/225 |
| 7,039,008 B1 | 5/2006 | Howes et al. ................. 370/220 |
| 7,301,946 B2 * | 11/2007 | Meier et al. .................... 370/390 |
| 7,310,342 B2 | 12/2007 | Rouleau ........................ 370/397 |
| 7,366,188 B2 | 4/2008 | Kim ............................... 370/401 |
| 7,400,590 B1 * | 7/2008 | Rygh et al. .................... 370/254 |
| 7,444,415 B1 | 10/2008 | Bazzinotti et al. ............ 709/229 |
| 7,522,520 B2 | 4/2009 | Griggs .......................... 370/230 |
| 7,523,185 B1 | 4/2009 | Ng et al. ....................... 709/223 |
| 7,619,966 B2 * | 11/2009 | Lee ................................ 370/218 |
| 7,664,056 B2 | 2/2010 | Dye et al. ...................... 370/260 |

(Continued)

OTHER PUBLICATIONS

T. Bradley and C. Brown, "Inverse Address Resolution Protocol," RFC 1293, Wellfleet Communications, Inc., Jan. 1992, pp. 1-6, ftp://ftp.rfc-editor.org/in-notes/rfc1293.txt.

(Continued)

*Primary Examiner* — Steve Young
(74) *Attorney, Agent, or Firm* — Campbell Stephenson LLP

(57) ABSTRACT

A method involves receiving information identifying one or more virtual connections (VCs) available within a network and one or more IP subnets. The information is received by the first of several nodes coupled by the network and identifies either (or both) a first VC that is not locally available at the first node and a first IP subnet that is not configured on the first node. Information identifying a global topology of the network is generated, based upon the received information. The global topology includes each of several active VCs within the network and each of several IP subnets configured on the nodes coupled by the network. One of the IP subnets is then assigned to the one of the VCs, based upon the global topology of the network, until all of the IP subnets are assigned, each to a unique VC.

19 Claims, 16 Drawing Sheets

(56) References Cited

U.S. PATENT DOCUMENTS

| | | | |
|---|---|---|---|
| 7,698,408 B1 * | 4/2010 | Johnsen et al. | 709/223 |
| 2002/0051456 A1 | 5/2002 | Kinnunen | 370/397 |
| 2002/0052972 A1 * | 5/2002 | Yim | 709/245 |
| 2002/0078379 A1 | 6/2002 | Edwards et al. | 703/201 |
| 2002/0176450 A1 | 11/2002 | Kong et al. | 370/466 |
| 2003/0055968 A1 | 3/2003 | Hochmuth et al. | 709/226 |
| 2003/0069958 A1 | 4/2003 | Jalava | 709/223 |
| 2003/0152038 A1 | 8/2003 | Oshima et al. | 370/252 |
| 2003/0154307 A1 | 8/2003 | Puthiyandyil et al. | 709/245 |
| 2004/0059828 A1 | 3/2004 | Hooper et al. | 709/238 |
| 2004/0081158 A1 | 4/2004 | Moll et al. | 370/395.1 |
| 2004/0223464 A1 | 11/2004 | Dye et al. | 370/260 |
| 2004/0255028 A1 | 12/2004 | Chu et al. | 709/227 |
| 2004/0264388 A1 * | 12/2004 | Rover et al. | 370/254 |
| 2005/0003827 A1 * | 1/2005 | Whelan | 455/454 |
| 2005/0117588 A1 | 6/2005 | Tseng et al. | 370/395.31 |
| 2005/0135234 A1 | 6/2005 | Saleh et al. | 370/218 |
| 2005/0169279 A1 * | 8/2005 | Magd et al. | 370/395.5 |
| 2007/0041329 A1 | 2/2007 | Schine | 370/250 |
| 2007/0081530 A1 | 4/2007 | Nomura et al. | 370/289 |
| 2007/0180109 A1 | 8/2007 | Brim | 709/225 |
| 2008/0005398 A1 | 1/2008 | Huffman | 710/39 |
| 2008/0034077 A1 | 2/2008 | Takashige et al. | 709/223 |
| 2008/0134315 A1 | 6/2008 | Tamura et al. | 726/12 |
| 2008/0313305 A1 | 12/2008 | Long | 709/217 |

OTHER PUBLICATIONS

Metro Ethernet Forum, "Technical Specification MEF 16, Ethernet Local Management Interface (E-LMI)," Jan. 2006, © The Metro Ethernet Forum 2006, 40 pages.

Robert W. Klessig and Cedric H. Druce, pending U.S. Patent Application entitled, "Local Auto-Configuration of Network Devices Connected to Multipoint Virtual Connections," U.S. Appl. No. 11/937,779, filed Nov. 9, 2007, including Specification: pp. 1-46 and Drawings: 12 sheets.

Klessig et al., pending U.S. Patent Application entitled, "Ethernet Local Management Interface (E-LMI)," U.S. Appl. No. 10/811,458, filed Mar. 26, 2004, including Specification: 59 pages and Drawings: 10 sheets.

* cited by examiner

| ND1 | EVC1 | EVC2 | EVC3 | EVC4 |
|---|---|---|---|---|
| S1 | ND1, ND4 | ND1 | ND4 | ND1, ND4 |
| S2 | ND1, ND2, ND3, ND4 | ND1, ND2, ND3 | ND2, ND3, ND4 | ND1, ND2, ND3, ND4 |
| S3 | ND1, ND2, ND3 | ND1, ND2, ND3 | ND2, ND3 | ND1, ND2, ND3 |
| S4 | ND3, ND4 | ND3 | ND3, ND4 | ND3, ND4 |

*FIG. 4*

| ND1 | EVC1 | EVC2 | EVC3 | EVC4 |
|---|---|---|---|---|
| S1 | 1 | 0 | 0 | 1 |
| S2 | 1 | 0 | 0 | 1 |
| S3 | 1 | 1 | 0 | 1 |
| S4 | 1 | 0 | 1 | 1 |

*FIG. 5*

| ND3 | EVC1 | EVC2 | EVC3 | EVC4 | S Entropy |
|---|---|---|---|---|---|
| S1 | 1 | 0 | 0 | 1 | 2 |
| S2 | 1 | 0 | 0 | 1 | 2 |
| S3 | 1 | 1 | 0 | 1 | 3 |
| S4 | 1 | 0 | 1 | 1 | 3 |
| E Entropy | 4 | 1 | 1 | 4 | |

| ND1 | EVC1 | EVC2 | EVC3 | EVC4 |
|---|---|---|---|---|
| S1 | 1 | 0 | 0 | 1 |
| S2 | 1 | 0 | 0 | 1 |
| S3 | 1 | 1 | 0 | 1 |
| S4 | 1 | 0 | 1 | 1 |

| ND1 | EVC1 | EVC2 | EVC3 | EVC4 |
|---|---|---|---|---|
| S1 | 1 | 0 | 0 | 1 |
| S2 |   | 0 | 0 | 1 |
| S3 |   | 1 | 0 | 1 |
| S4 |   | 0 | 1 | 1 |

| ND1 | EVC1 | EVC2 | EVC3 | EVC4 |
|---|---|---|---|---|
| S1 | 1 | 0 | 0 | 1 |
| S2 | 1 | 0 | 0 | |
| S3 | 1 | 1 | 0 | |
| S4 | 1 | 0 | 1 | |

| ND1 | EVC1 | EVC2 | EVC3 | EVC4 |
|---|---|---|---|---|
| S1 | 1 | 0 | 0 | 1 |
| S2 |  | 0 | 0 | 1 |
| S3 |  | 1 | 0 |  |
| S4 |  | 0 | 1 |  |

| ND1 | EVC1 | EVC2 | EVC3 | EVC4 |
|---|---|---|---|---|
| S1 | 1 | 0 | 0 | 1 |
| S2 | 1 | 0 | 0 | |
| S3 | | 1 | 0 | |
| S4 | | 0 | 1 | |

| ND1 | EVC1 | EVC2 | EVC3 | EVC4 |
|---|---|---|---|---|
| S1 | 1 | 0 | 0 | 1 |
| S2 |  | 0 | 0 | 1 |
| S3 |  | 1 | 0 |  |
| S4 |  |  | 1 |  |

GLOBAL AUTO-CONFIGURATION OF NETWORK DEVICES CONNECTED TO MULTIPOINT VIRTUAL CONNECTIONS

FIELD OF THE INVENTION

This invention relates to networking and, more particularly, to performing auto-configuration in networks, such as Metro Ethernet Networks, that provide virtual connections (i.e., connections that do not necessarily have a one-to-one correspondence with the actual underlying physical connections) among multiple endpoints.

BACKGROUND

Service Providers (SPs) use Wide Area Networks (WANs) and Metropolitan Area Networks (MANs) to provide customers with connectivity to the Internet and/or with connectivity to geographically diverse customer locations. Historically, WANs and MANs have been implemented using Synchronous Optical Networks (SONET), Frame Relay, or Asynchronous Transfer Mode (ATM) technologies. Recently, however, Service Providers have begun to use Ethernet technology to implement WANs and MANs. Such implementations use Ethernet as the frame format to connect the subscriber's equipment, called a Customer Edge (CE) device, to the network. Alternatively, such implementations can involve encapsulating an Ethernet frame according to one of several other protocols (or vice versa) to achieve the transfer of the Ethernet frame from the CE device to the Service Provider's network. The point of demarcation between the CE device and the Service Provider's network is referred to as the User-to-Network Interface (UNI).

Ethernet Virtual Connections (EVCs) provide the fundamental connectivity mechanism for Ethernet-based MAN and WAN service. An EVC associates a group of UNIs. The UNIs coupled by the same EVC form a closed user group, such that Ethernet frames entering the EVC at one UNI that are mapped to a given EVC can only exit the network at another UNI that is associated with the same given EVC.

EVCs can be point-to-point, multipoint-to-multipoint, or rooted-multipoint. Point-to-point EVCs couple exactly two UNIs. Multipoint-to-multipoint EVCs can associate more than two UNIs. When a multipoint EVC is used, a single Ethernet frame that enters the multipoint EVC at one UNI can be replicated within the Service Provider network, such that copies of that Ethernet frame exit the network at multiple other UNIs (e.g., if multicast transmission is desired) or at all of the other UNIs (e.g., if broadcast transmission is desired) associated by that EVC. A rooted-multipoint EVC designates each UNI coupled by that rooted-multipoint EVC as either a root or a leaf. Traffic entering an EVC at a root UNI can be sent to any or all of the other UNIs associated by the EVC; however, traffic entering an EVC at a leaf UNI can only be sent to root UNIs associated by the EVC.

A customer wishing to create a topology using an Ethernet-based WAN or MAN can connect a device such as an Internet Protocol (IP) router at each of a number of UNIs and associate an IP subnet with each of the available EVCs. In such a situation, control and provisioning of EVCs in the network are under the administrative control of the Service Provider (SP), while the configuration of the router is under the customer's administrative control. This split in administrative domains can lead to a number of challenges. At the most practical level, the split requires the SP and customer to coordinate their efforts and (even if attempts are made to coordinate) a number of potential problems, including misconfigurations, confusion about when service will become active, and the like, may arise. To reduce likelihood of these problems, it is desirable to decouple, as much as is possible, the configuration tasks of the SP from the configuration tasks of the customer.

BRIEF DESCRIPTION OF THE DRAWINGS

A more complete understanding of the present invention may be acquired by referring to the following description and the accompanying drawings, in which like reference numbers indicate like features.

FIG. 4 illustrates a global subnet-to-EVC incidence (SEI) table that can be generated by each of the four nodes of FIG. 2, according to one embodiment of the present invention.

FIG. 5 each illustrates a maximal SEI (MSEI) table that can be generated by each of the four nodes of FIG. 2, according to one embodiment of the present invention.

Figure 1:
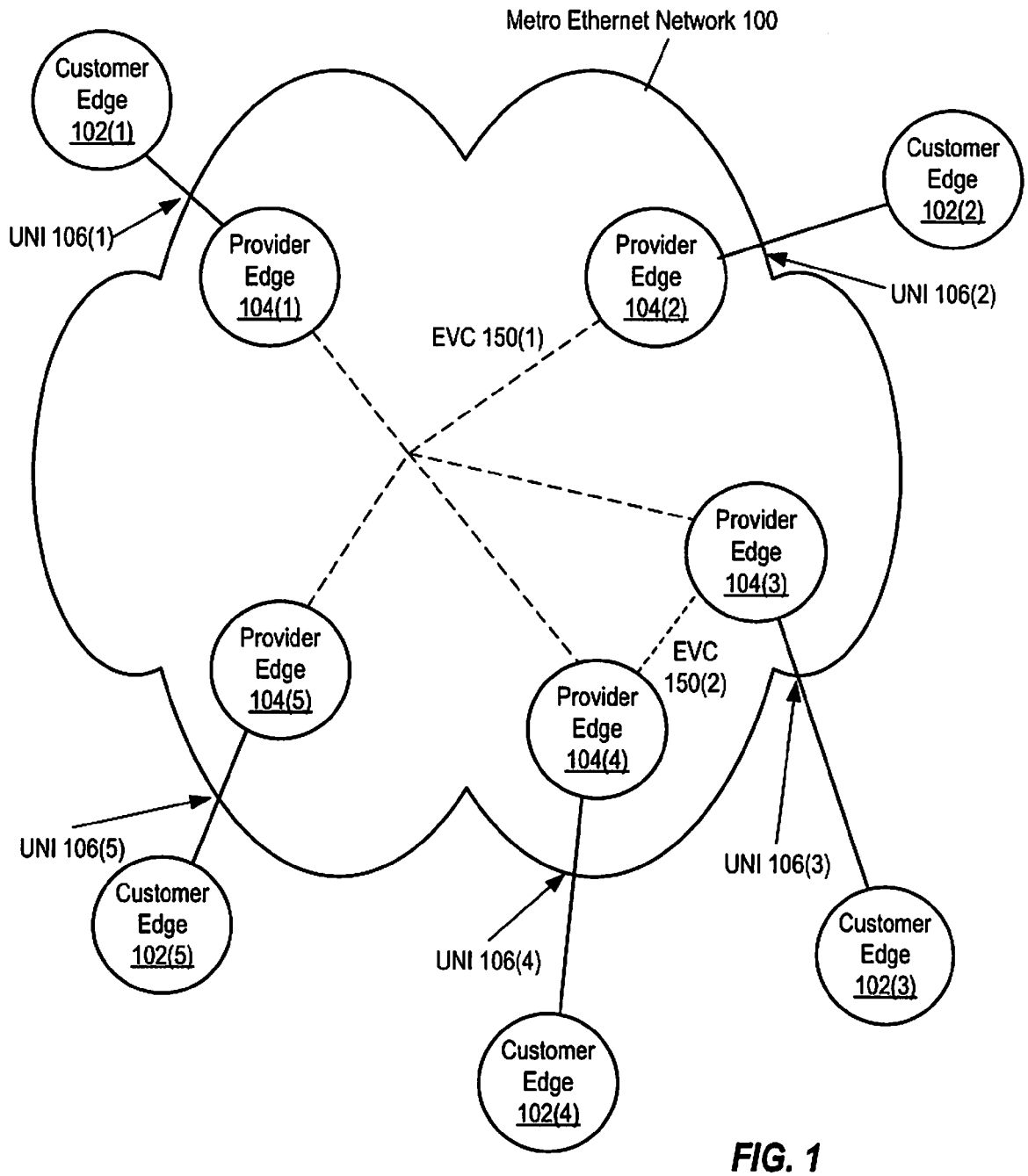
FIG. 1 is a block diagram of a Metro Ethernet Network (MEN) that implements a multipoint-to-multipoint EVC.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A node, which is coupled to a MAN or WAN that provides (or potentially provides) multipoint virtual connections, can perform auto-configuration by automatically assigning IP subnets to virtual connections. Initially, a customer of a Service Provider configures the node with one or more IP subnets to be assigned to appropriate virtual connections. A Service Provider configures the virtual connections within the MAN or WAN. The node receives information identifying all of the virtual connections that are available within the MAN or WAN, and then automatically identifies which other nodes are connected to those virtual connections. The node also identifies the IP subnets configured on those other nodes. All nodes in the MAN or WAN obtain the same global topology information. Based on the identified global virtual connection topology, each node can then assign IP subnets to virtual connections in a manner that is consistent with each other node. Alternatively, a single node can collect global topology information, assign IP subnets to virtual connections, and distribute the assignments to each other node in the MAN or WAN.

Various examples of how such a node can automatically assign IP subnets to virtual connections are provided herein. These examples are provided in the context of a Metro Ethernet Network (MEN); however, it is noted that similar autoconfiguration schemes can be implemented within other types of networks that provide multipoint virtual connections, regardless of whether these networks are implemented using Ethernet technology.

FIG. 1 is a block diagram of a Metro Ethernet Network (MEN) that implements a multipoint-to-multipoint EVC. Within MEN 100, each point at which a customer edge device connects to the Service Provider's MEN is referred to as a User-to-Network Interface, or UNI. As shown in this example, MEN 100 includes provider edge devices 104(1)-104(5). Each provider edge (PE) device is attached to a respective customer edge (CE) device 102(1)-102(5) at a respective UNI. In particular, customer edge device 102(1) is coupled to MEN 100 at UNI 106(1). Customer edge device 102(2) is coupled to MEN 100 at UNI 106(2). Customer edge device 102(3) is coupled to MEN 100 at UNI 106(3). Customer edge device 102(4) is coupled to MEN 100 at UNI 106(4). Customer edge device 102(5) is coupled to MEN 100 at UNI 106(5).

It is noted that there may not always be a one-to-one correspondence between customer edge devices and provider edge devices. For example, a single customer edge device can connect to several provider edge devices within the MEN. Similarly, several different customer edge devices can connect to the same provider edge device, but each will connect via a different UNI.

Traffic sent across a UNI is described as being sent in an ingress or egress direction. "Ingress" and "egress" are defined relative to the MEN. Traffic traveling in the ingress direction is being sent from a customer edge device to MEN 100. Traffic traveling in the egress direction is being sent to a customer edge device from MEN 100.

Two EVCs have been implemented within MEN 100. EVC 150(1) (represented by dashed lines) includes UNIs 106(1)-106(5). Accordingly, EVC 150(1) provides a multipoint-to-multipoint connection between customer edge devices 102(1)-102(5). In a multipoint-to-multipoint connection, each customer edge device 102(1)-102(5) can send a message directly to any (or all) of the other customer edge devices coupled by multipoint-to multipoint EVC 150(1).

EVC 150(2) (represented by a dotted line) includes UNIs 106(3)-106(4) and provides a multipoint-to-multipoint connection between customer edge devices 102(3) and 102(4). While EVC 150(2) is currently only being used to connect two customer edge devices (and thus is currently functioning as a point-to-point connection), EVC 150(2) differs from a point-to-point connection in that additional UNIs are allowed to join (and subsequently leave) EVC 150(2) without disrupting EVC 150(2).

Rooted-multipoint EVCs can also be implemented within a network such as MEN 100. Like a multipoint-to-multipoint EVC, a rooted-multipoint EVC is capable of including more than two UNIs. However, unlike a multipoint-to-multipoint EVC, a rooted-multipoint EVC restricts communication between customer edge devices coupled by the rooted-multipoint EVC. In a rooted-multipoint EVC, one or more UNIs in the rooted-multipoint EVC are designated as "root" UNIs and all of the other UNIs included in the rooted-multipoint EVC are designated as "leaf" UNIs. The customer edge device coupled to a root UNI in this EVC can send messages to any of the customer edge devices coupled to root or leaf UNIs in this EVC. However, the customer edge devices coupled to the leaf UNIs in this EVC can only send messages to the customer edge device coupled to root UNIs in this EVC.

Figure 2:
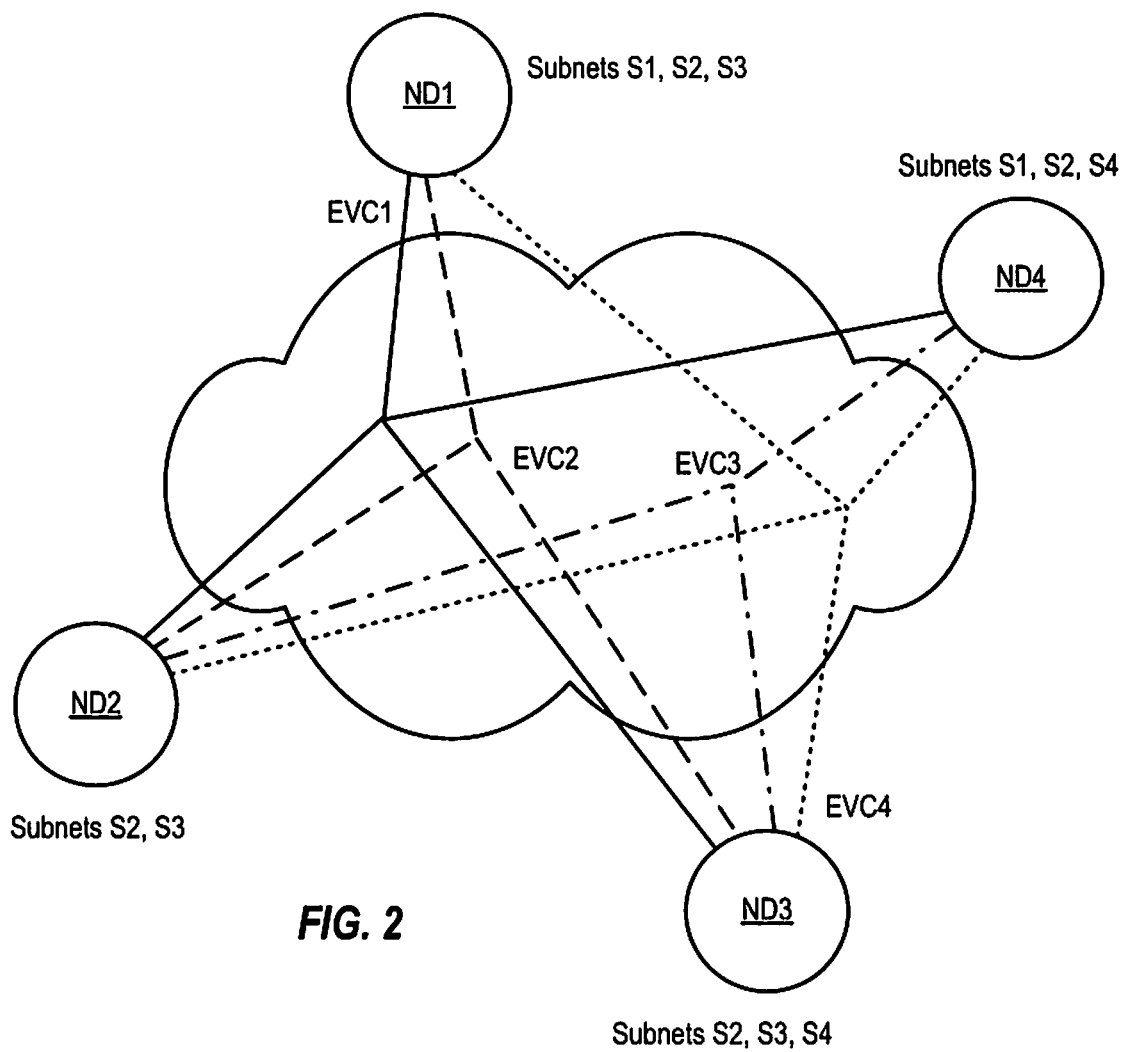
FIG. 2 illustrates four nodes that are configured to automatically identify which EVCs are active and to automatically assign an IP subnet to an active EVC, according to one embodiment of the present invention.

FIG. 2 illustrates four nodes ND1-ND4 that are configured to automatically identify which EVCs are available within the MEN. The nodes are also each configured to automatically assign an IP subnet to one of the identified EVCs. Examples of how nodes ND1-ND4 can assign IP subnets to available EVCs are provided below in the discussions of FIGS. 4-10.

As shown, Node 1 (ND1) has been configured with IP subnets S1, S2, and S3. EVC1 (represented by solid lines), EVC2 (represented by dashed lines), and EVC4 (represented by a dotted lines) are the locally available EVCs at ND1. Node 2 (ND2) has been configured with IP subnets S2 and S3. EVC1, EVC2, EVC3 (represented by lines that include alternating dashes and dots), and EVC4 are locally available to ND2. Node 3 (ND3) has been configured with IP subnets S2, S3, and S4. EVC1, EVC2, EVC3, and EVC4 are locally available to ND3. Node 4 (ND4) has been configured with IP subnets S1, S2, and S4. EVC1, EVC3, and EVC4 are locally available to ND4.

An administrator can configure each of nodes ND1-ND4 to use one or more IP subnets. Typically, the administrator that configures the IP subnets will be in the employ of the customer that operates nodes ND1-ND4. In contrast, the EVCs will typically be configured by an administrator in the employ of the Service Provider that operates the MEN that includes EVCs EVC1-EVC4.

Figure 3:
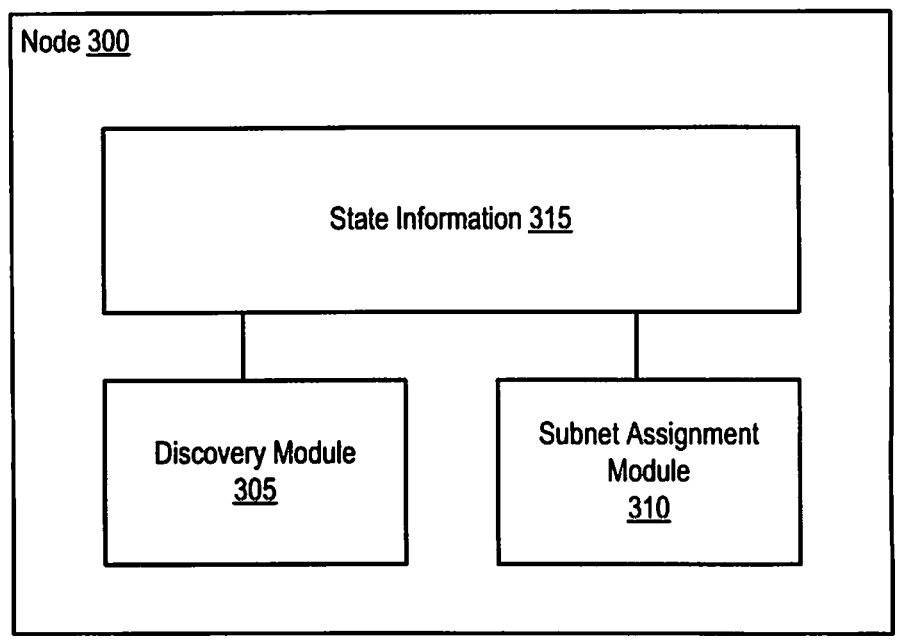
FIG. 3 illustrates a block diagram of a node, according to one embodiment of the present invention.

FIG. 3 illustrates a block diagram of a node 300 (e.g., one of nodes ND1-ND4 of FIG. 2). Node 300 can be any one of a variety of network devices, including routers, switches, bridges, and the like.

In this embodiment, node 300 includes a discovery module 305, a subnet assignment module 310, and state information 315. Discovery module 305 and subnet assignment module 310 can each be implemented in hardware, software, or a combination of hardware and software. It is noted that node 300 can include a variety of other components (e.g., such as network interfaces or ports, routing tables, and so on) and implement a variety of other functionality; however, for simplicity, only these components are illustrated in FIG. 3. More details regarding possible implementations of node 300 are provided in FIGS. 11 and 12, which are described below.

State information 315 includes information used to assign IP subnets to EVCs (or other virtual connections), as well as the assignments themselves. State information 315 can be stored in any of a variety of suitable storage media. State information 315 can include information identifying the global topology of the MEN, including the IP subnets to be assigned and information identifying the EVCs available within the MEN, as well as information identifying which IP subnets are assigned to which EVCs. In one embodiment, state information 315 can also include a tree (e.g., such as the one constructed in FIGS. 9A-9G below) that node 300 has constructed for use in generating assignments.

When an administrator configures a node with IP subnets, the administrator can access a user interface (e.g., a command line interface (CLI), graphical user interface (GUI), or the like) to node 300 and enter information identifying the IP subnets via that user interface. An administrator can also (or alternatively) use an administration tool that implements a programmatic interface such as Simple Network Management Protocol (SNMP) or eXtensible Markup Language (XML) to interface with a node. In response to receiving the information identifying IP subnets from an administrator, node 300 can store information identifying the IP subnets as part of state information 315. Node 300 can also receive information identifying IP subnets configured on other nodes and store the received information as part of state information 315.

Discovery module 305 is configured to discover which EVCs are locally available and to store information identifying the locally available EVCs as part of state information 315. Discovery module 305 can discover which EVCs are locally available in a variety of ways. In one embodiment, discovery module 305 is configured to receive that information from an administrator via a user or programmatic interface.

In other embodiments, discovery module 305 implements a protocol, such as Ethernet Local Management Interface (E-LMI), that lets customer equipment, such as node 300, learn about EVCs available at the UNI to which the customer equipment is coupled. In this protocol, Service Provider equipment at a UNI delivers protocol messages to the customer equipment at the UNI. The customer equipment then extracts information, such as information identifying the EVCs available at the UNI, and stores that information as part of state information 315.

Discovery module 305 can also receive information from other nodes that identifies EVCs that are available within the MEN but that are not locally available to node 300. For example, a node coupled to another UNI can send node 300 information identifying one or more EVCs that are not available at the UNI to which node 300 is coupled. This additional information can also be stored as part of state information 315.

Subnet assignment module 310 is configured to use state information 315 to assign IP subnets to EVCs, and to write information identifying the assignments in state information 315. Subnet assignment module 310 can implement a protocol that allows node 300 to communicate with other nodes, via the locally available EVCs or any other suitable communication channel, in order to discover the topology of the EVCs in the MEN.

Once node 300 has identified the global topology of the MEN (i.e., once each node has identified all of the active EVCs within the MEN and all of the active nodes coupled by those active EVCs), node 300 can use a prespecified algorithm (e.g., either the entropy-based algorithm or the tree-based algorithm, both of which are described below) to generate assignments assigning each IP subnet to an EVC. Since node 300 generates its assignments based upon the global MEN topology and uses a prespecified algorithm to generate the assignments, the assignments created by node 300 will be consistent with any other assignments generated by other nodes in the MEN configured to obtain the same global topology and to use the same prespecified algorithm. Once the assignment of each IP subnet to an EVC is established, subnet assignment module 310 can use Address Resolution Protocol (ARP) to obtain the IP address-to-Media Access Control (MAC) address binding of the remote nodes coupled to node 300 by the locally available EVCs.

To obtain the information identifying the global topology, subnet assignment module 310 of node 300 exchanges messages with subnet assignment modules in different nodes. For example, initially, subnet assignment module 310 can send a message that identifies node 300 (e.g., by a globally unique node identifier), as well as the IP subnets that have been configured on node 300, on each EVC that is locally available to node 300 (thus, this message may not be sent on all EVCs, since node 300 may be coupled to fewer than all EVCs). Alternatively, such a message can be sent via another communication channel that couples node 300 to other nodes coupled to the MEN.

The globally unique identifier that can be used to name node 300 (and thus the UNI to which node 300 is attached at that point in time) can be any identifier that is guaranteed to be unique among nodes coupled to the MEN. For example, the globally unique identifier can be the MAC address of an Ethernet Network Interface Card (NIC) that is included within node 300 and attached to the Ethernet WAN.

In one embodiment, EVC identifiers are generated by each node. Initially, each node assigns a unique provisional identifier to all locally available EVCs. Each node will generate a locally unique number and then combine that number with the node's globally unique identifier (e.g., by appending, prepending, or otherwise combining the globally unique identifier of the node with the locally unique identifier generated for the EVC). When a node sends a message identifying the node and the subnets configured on that node via a particular EVC, the sending node can include its provisional identifier for that EVC in the message. After the sending node receives messages from the other nodes coupled to that EVC, the sending node can use a prespecified algorithm to sort the EVC identifiers and to select one of the EVC identifiers as the non-provisional identifier (e.g., all nodes can be configured to select the lowest provisional EVC identifier for use as the non-provisional EVC identifier). As a result of this exchange, all nodes coupled to the same EVC will select the same non-provisional EVC identifier.

Subnet assignment module 310 will also receive the messages that other nodes have sent via their locally available EVCs (or any other suitable communication channel). Like the message sent by subnet assignment module 310, these messages can include a globally unique identifier that identifies the sending node as well as a list of IP subnets configured on the sending node. Note that subnet assignment module 310 may not receive messages directly from all of the other nodes coupled to the MEN, since some of those nodes may only be coupled to EVCs that are not locally available to node 300. Instead, information about such nodes can be received from other nodes, as described in more detail below. Node 300 uses the messages received from other nodes to determine which EVCs are included within the MEN, as well as which IP subnets can be assigned to each of the EVCs.

In one embodiment, receipt of a message from a particular node via a particular EVC indicates that the EVC is locally available to the sending node. Accordingly, in response to node 300 receiving a message via a particular EVC, subnet assignment module 310 can generate information associating that EVC with the globally unique identifier of the sending node. Subnet assignment module 310 can also generate information associating the IP subnets identified within the message with the sending node. For example, if node 300 receives a message from node X via EVC1, and that message identifies IP subnets S2 and S4, subnet assignment module 310 can generate information indicating that node X is coupled to EVC1 and that node X needs to assign IP subnets S2 and S4. Such information can be stored, at least temporarily, as part of state information 315. In one embodiment, such information is stored in a table like that shown in FIG. 4, where each row corresponds to an IP subnet, each column corresponds to an EVC, and each cell contains zero or more globally unique node identifiers.

Once the information identifying the locally available EVCs has been exchanged, the nodes can begin exchanging information usable by node 300 to identify other EVCs that are not locally available to node 300. For example, another node may be coupled to a first EVC that is not locally available to node 300, while also being coupled to a second EVC that is locally available to node 300. This other node can forward information about the topology of the first EVC (e.g., such as the identifiers of the nodes coupled by that EVC, the subnets configured on those nodes, and the like) to node 300 via the second EVC (or via another suitable communication channel). Information like this can be used to completely identify the global topology of the MEN at node 300.

In order to ensure that all information about the global topology is propagated to the node(s) that will assign IP subnets to EVCs, the nodes can be configured to send a copy of all of their local topology information to one or more other nodes (e.g., by sending messages via each locally available EVC) each time that the local topology information changes. Thus, if subnet assignment module 310 of node 300 modifies its topology information in response to receiving a message identifying a formerly unknown EVC, subnet assignment module 310 will send its modified topology information to one or more other nodes. Subnet assignment module 310 can continue to resend its information until its information changes again or until a certain number of identical messages have been sent. In one embodiment, subnet assignment module 310 will continue to send its information until the number of identical messages (i.e., messages that do not identify any new information) received from other nodes is greater than a threshold value.

In one embodiment, the protocol used by subnet assignment module 310 to exchange topology information is implemented using Ethernet messages, since the Transmission Control Protocol (TCP)/IP protocol stack may not yet be available at the point (e.g., during startup of node 300) at which auto-configuration is being performed (e.g., because an IP address may not yet have been assigned). Since Ethernet does not provide for reliable transport, the protocol can be configured such that each node will resend identical messages until the node receives an acknowledgement or other indication that the message was received.

Information exchanged by the protocol can include the node identifier described above, as well as the EVC identifiers described above. The messages exchanged by the protocol can also include information usable by subnet assignment module 310 to determine the "freshness" of each message, such as a clock value representing the relative time at which each message was sent. Similarly, each message exchanged by the protocol can include a sequence number generated by the sending node, such that consecutive messages sent by a given node will have consecutive ascending or descending sequence numbers. Subnet assignment module 310 can use the sequence number in received messages in order to determine whether any intervening messages have been lost.

The messages exchanged by the protocol can also include a particular value (e.g., a start delimiter, protocol identifier, or the like) that identifies that these messages are being sent as part of the auto-configuration protocol. This information can cause the messages to be sent to subnet assignment module 310 for handling when received by node 300, and can also indicate that the messages are formatted in a manner that complies with the auto-configuration protocol. The messages can also include a checksum or other integrity information usable by subnet assignment module 310 to verify the messages.

As noted above, the body of the messages exchanged via the protocol can include topology information, such as a node identifier, a list of subnet(s) configured on the identified node, entropy values (e.g., the subnet (S) and/or EVC (E) entropy values described below), and the like. Such information can be organized in a vector, array, or matrix. Accordingly, the message can include information that identifies the dimensions of the array in terms of rows and/or columns (e.g., an N×M array), the identity of each dimension (e.g., columns can be associated with EVCs and rows can be associated with subnets), the format of the information stored in the array (e.g., comma separated values, or the like), and the type of information stored in the array (e.g., node identifiers, integers, etc.).

In one embodiment, information within each message is encoded using {Type, Length, Value} (TLV) triplets, where the value of the Type field indicates the type of information, the value of the Length field indicates the total length of the Value field. The Value field includes information that is appropriate to the specified Type. For example, the value of the Type field can be "Array," and the value of Length can include several sub-fields specific to the Array type. The first sub-field can be a fixed-length field that indicates the dimensionality of the array. The second sub-field can be a fixed-length field that indicates the length of a variable-length third sub-field, which in turn can contain a comma separated list of alphanumeric tags that indicate what (e.g., IP subnet, EVC, or the like) each dimension of the array represents. The fourth sub-field can be a fixed-length field that describes the content (e.g., node identifiers, integers, or the like) of each cell within the array. A fifth fixed-length sub-field can indicate the length of the sixth sub-field, which can indicate the value or values for the information described by fourth sub-field.

In one embodiment, associations between values (e.g., associations between EVCs, IP subnets, and/or node identifiers) can be encoded using arrays. For example, the array can include fields indicating the dimensions of the array, the variables that may be associated, and the values of those variables. An additional field in the array can indicate an association status of a set of values (e.g., zero (0) can indicate no association between the values and one (1) can indicate that the values are associated). It is noted that some variables can have values that are determined based upon characteristics of the message itself (e.g., the value of an EVC variable can be the identifier of the EVC via which the message was received).

The protocol can also include various message types. Various message types can be used to confirm status (e.g., one node can send such a message to another node to indicate that the sending node is still active or to request status from another node), request the sequence number of the last message sent by a remote node, and request that certain messages be resent (e.g., in response to detecting that a message containing a particular sequence number has not been received, a node can request that the message having that sequence number be resent). Similarly, various message types can be used to request the state of another node and to send the local state to another node. One message type can be used to signal the occurrence of error conditions (e.g., in one embodiment, receipt of such a message can cause the auto-configuration process to restart). Other message types can be used to signal changes in configuration information (e.g., if a new node is attached to the MEN or if an existing node is shutting down, such a message can be used to inform all the other nodes of the change or imminent change). Still other message types can be used to request particular types of information, to convey particular types of information, and the like.

In one embodiment, the protocol allows information be broken up into multiple messages. Thus, the messages can include a value that indicates the appropriate order of individual messages (e.g., message 1 of N, message 2 of N, and the like), allowing subnet assignment module 310 to reassemble the information from the multiple messages.

In one embodiment, the information contained within the messages is encoded as American Standard Code for Information Interchange (ASCII) strings (e.g., for non-numeric information) and/or as hexadecimal digits (e.g., for numeric information). Other encodings can be used, as appropriate.

Subnet assignment module 310 performs auto-configuration (e.g., by assigning IP subnets to EVCs) based upon global knowledge of the entire topology of the MEN (e.g., as indicated by state information 315). The protocol used by subnet assignment module 310 to perform auto-configuration involves node 300 (or any other node) obtaining and/or distributing global knowledge of the entire MEN topology to other nodes, using the protocol described above (or another suitable protocol).

In some embodiments, each node coupled by the MEN identifies the global topology of the MEN and then generates its own assignments, based upon the global topology. In alternative embodiments, the identification of the global topology and/or generation of the corresponding assignments is centralized in a single node within the MEN.

Thus, in some embodiments, node 300 can act as a centralized node (e.g., a "master" node) that identifies the global topology and/or generates assignments for the entire MEN and then forwards the global topology and/or those assignments to the other nodes coupled by the MEN. For example, in one embodiment, node 300 can obtain information (e.g., from an administrator and/or from other nodes coupled by the MEN) usable to identify the global topology of the MEN and then use that global topology to generate the assignments, which can then be distributed to all other nodes.

Based upon the global topology information (e.g., the information stored in state information 315, which includes both information obtained by node 300 and information received from other nodes), subnet assignment module 310 can then begin the process of assigning IP subnets to EVCs. In one embodiment, subnet assignment module 310 uses an entropy technique to identify the IP subnet that is most constrained, and then assign that IP subnet to an EVC that satisfies the most constrained IP subnet's connectivity requirements. For example, if there is only one EVC that satisfies the connectivity requirements of an IP subnet, then that IP subnet should be assigned to that EVC. If there are several EVCs that satisfy the requirements of the IP subnet, then subnet assignment module 310 can assign the IP subnet to any one of those EVCs.

In one embodiment, the process of identifying the most constrained IP subnet involves several actions. Initially, for each unique pairing of IP subnets and EVCs, subnet assignment module 310 can identify the set of nodes that are both configured with that IP subnet and coupled to that EVC (e.g., by constructing a subnet-to-EVC incidence table like that shown in FIG. 4). For example, if node 300 has been configured with two IP subnets SA and SB and is coupled to 3 EVCs EVC1-EVC3, there will be six possible IP subnet-to-EVC pairs: (SA, EVC1), (SA, EVC2), (SA, EVC3), (SB, EVC1), (SB, EVC2), and (SB, EVC3). For each subnet-to-EVC pair, subnet assignment module 310 can identify the node(s), if any, that are both configured with that IP subnet and coupled to that EVC. These node(s) are then associated with that IP subnet-to-EVC pair.

For each subnet, subnet assignment module 310 can then determine which subnet-to-EVC pair is associated with the greatest number of nodes (e.g., by constructing a maximal subnet-to-EVC incidence table like that shown in FIG. 5). For example, if there are three subnet-to-EVC pairs for a given subnet, subnet assignment module 310 compares the number of nodes associated with each of those three pairs. It is noted that, for each subnet, there may be more than one subnet-to-EVC pair that is associated with the greatest number of nodes.

Subnet assignment module 310 can also calculate a subnet entropy value for each subnet. This subnet entropy value indicates how many EVCs satisfy the requirements of each subnet. The subnet entropy value for a subnet equals the number of subnet-to-EVC pairs associated with that subnet that are associated with a maximum number of nodes. Thus, the subnet entropy value indicates how constrained an associated subnet is.

After identifying the subnet-to-EVC pair (or pairs) associated with the greatest number of nodes for each subnet, subnet assignment module 310 identifies the subnets whose requirements can be satisfied by each EVC. Subnet assignment module 310 identifies these subnets by identifying, for a given EVC, which subnet-to-EVC pairs are associated with the greatest number of nodes. Thus, if three subnets are associated with a particular EVC, subnet assignment module 310 determines which, if any, of the three corresponding subnet-to-EVC pairs has been identified as being associated with the greatest number of nodes for an associated subnet. If one of the pairs has been so identified, then subnet assignment module 310 identifies that the corresponding subnet's requirements can be satisfied by the associated EVC.

Subnet assignment module 310 can also determine an EVC entropy for each EVC. This EVC entropy value identifies the number of subnets whose requirements an associated EVC can satisfy.

Once subnet assignment module 310 has obtained a subnet entropy value for each subnet and an EVC entropy value for each EVC, subnet assignment module 310 can assign the subnet that has the lowest subnet entropy to an EVC that satisfies the selected subnet's requirements. The selected EVC also has the lowest EVC entropy of the EVCs that satisfy the selected subnet's requirements. If there is a tie between subnets or EVCs (i.e., if multiple subnets have the same subnet entropy or if multiple EVCs have the same EVC entropy), subnet assignment module 310 uses a prespecified algorithm to break the tie (e.g., subnet assignment module 310 can be configured to select the "lowest" subnet or EVC in such a situation).

Subnet assignment module 310 can then recalculate the subnet and EVC entropies in a manner that disregards the subnet that has just been assigned and the EVC to which that subnet has been assigned. Based upon the new entropy values, subnet assignment module 310 can then generate the next assignment. This process repeats until subnet assignment module 310 has assigned all subnets identified in the global topology.

Accordingly, subnet assignment module 310 is configured to prioritize subnet-to-EVC assignments in such way that the most constrained subnet (the subnet that has the lowest subnet entropy) is assigned first. For example, if there is only one EVC that satisfies the connectivity requirements of an IP Subnet, then that EVC should be assigned to that IP Subnet. If one subnet's connectivity requirements can be satisfied by four EVCS and a second subnet's connectivity requirements can only be satisfied by two EVCs, then the second subnet should be assigned first. In some embodiments, subnet assignment module 310 can calculate an entropy value for each subnet and EVC in order to identify how flexible or how constrained the potential mappings are.

If assignment functionality is distributed among multiple nodes in the MEN, each node can be configured to first identify the global topology and then generate assignments using the entropy-based algorithm described above. Since all nodes generating assignments use the same global topology information and the same entropy-based algorithm, all nodes will necessarily generate the same assignments. Accordingly, there is no need to exchange additional messages with other nodes before making an assignment.

In an alternative embodiment, instead of using the entropy-based algorithm described above, subnet assignment module 310 generates a tree in which each tree node represents a possible assignment of an IP subnet to an EVC. Such a tree is shown in FIGS. 9A-9G below. The tree is generated based upon a maximal SEI table such as the one shown in FIG. 5 below. Each path (which begins at the root of the tree and progresses downward through a string of tree nodes) that represents all IP subnets to be assigned yields a valid set of assignments of IP subnets to EVCs.

In particular, the tree can be generated by creating a branch (i.e., a connection between tree nodes) from an imaginary root of the tree to the first tree node, and then constructing additional branches to connect that first tree node to one or more other tree nodes, and so on.

Each tree node corresponds to a non-zero entry of a particular row of the maximal SEI table, if each row of the maximal SEI table corresponds to an IP subnet (if instead each column of the maximal SEI table corresponds to an IP subnet, a tree node can be created for each non-zero entry in a particular column of the maximal SEI table). The particular IP subnet selected to identify the tree node does not matter, so long as all nodes generating assignments select the same initial IP subnet and use the same technique to select subsequent IP subnets. For example, in one embodiment, each row in the maximal SEI table corresponds to a different IP subnet, and the rows are arranged in order of ascending subnet identifiers, such that the first row of the maximal SEI table corresponds to the lowest subnet identifier. In such an embodiment, subnet assignment module 310 can be configured to begin with the first row of the table when constructing the tree.

Subnet assignment module 310 creates a tree node corresponding to the initial IP subnet in each branch. The tree node identifies both the initial IP subnet and an EVC to which that subnet may be assigned. Since each tree node corresponds to a different cell of the maximal SEI table, each of the initial tree nodes will identify a different IP subnet and EVC pair.

Subsequent branches originating at each tree node can then be added on a row-by-row basis (or column-by-column basis if the columns in the maximal SEI table correspond to IP subnets). In particular, for a given tree node, the column(s) (or rows, if rows correspond to EVCs) that are already represented by tree nodes in the path from the root to the given tree node are ignored, and any non-zero cells in the next row (or column, if columns correspond to IP subnets) are selected. A tree node corresponding to each selected cell is then added to each new branch.

To represent a complete solution (i.e., one in which all IP subnets configured on the nodes coupled by the MEN are assigned to satisfactory EVCs), a path beginning at the imaginary root of the tree should have one tree node that corresponds to each IP subnet. If a particular path lacks a tree node corresponding to one or more of the IP subnets, that path cannot represent a complete solution. Thus, if each row of the maximal SEI table corresponds to an IP subnet, the path should contain one tree node for each row of the maximal SEI table to represent a complete solution. If there are multiple paths that represent a complete solution, subnet assignment module 310 will use a prespecified algorithm to select one of the paths. For example, subnet assignment module 310 can be configured to select the leftmost path (e.g., the path corresponding to the lowest EVC identifiers, if columns are arranged in order of ascending EVC) that represents a complete solution.

In some embodiments, multiple paths (or even all possible paths) are constructed simultaneously. In other embodiments, subnet assignment module 310 is configured to construct paths serially. In such embodiments, subnet assignment module 310 will construct a second path only if the first path to be constructed fails to represent a complete solution. Similarly, subnet assignment module 310 will construct a third path only if both the first and second paths fail to provide a complete solution. If paths are constructed serially, only one non-zero cell is selected per IP subnet. The selection of the non-zero cell can be determined by a prespecified algorithm. For example, subnet assignment module 310 can be configured to select the leftmost non-zero cell (e.g., the cell corresponding to the lowest EVC, if columns are arranged in order of ascending EVCs) in the next row down (e.g., if the rows are arranged in order of ascending IP subnets).

If the assignment functionality is distributed among multiple nodes coupled by the MEN, each node can be configured to identify the global topology and to construct a maximal SEI table in the same manner as each other node. Each node can then use the same prespecified algorithm to construct the tree and, if multiple paths present complete solutions, to select one of those paths. Accordingly, since each node will use the same global topology information and the same algorithm, each node will necessarily generate the same assignment.

FIG. 4 illustrates a global Subnet-to-EVC incidence (SEI) table. This table can generated by each one of the four nodes of FIG. 2, if the functionality for generating SEI tables is distributed among all four nodes. If instead such functionality is centralized, the SEI table of FIG. 4 can be generated by a single node and then the SEI table and/or assignments generated based upon the SEI table can be forwarded to each of the other nodes.

The global SEI table is organized into rows associated with subnets and columns associated with EVCs. Each cell within an SEI table stores information (e.g., one or more globally unique identifiers) identifying one or more nodes. The SEI table identifies the IP subnets that need to be assigned by the nodes coupled by the MEN and the EVCs that are candidates to have those IP subnets assigned to them. The SEI table also identifies the nodes that can be reached by each EVC.

The following description illustrates how node ND1 of FIG. 2 can construct the global SEI table of FIG. 4. It is noted that the other nodes of FIG. 2 can use similar techniques to generate their own copies of the global SEI tables, and that all of the nodes in FIG. 2 will ultimately generate the same global SEI table.

As shown in FIG. 2, node ND1 is coupled to active EVCs EVC1, EVC2, and EVC4. Additionally, node ND1 has been configured with subnets S1, S2, and S3. Initially, ND1 can send messages on each of EVCs EVC1, EVC2, and EVC4 that identify ND1 and that identify the subnets S1, S2, and S3 configured on ND1. In addition to sending messages to other nodes to indicate the subnets of interest to ND1, ND1 will also update the cells corresponding to the locally available EVCs and locally configured subnets to indicate that ND1 is potentially interested in assigning each locally configured subnet to each locally available EVC. In particular, node ND1 will add ND1 to the cells corresponding to (S1, EVC1), (S1, EVC2), (S1, EVC4), (S2, EVC1), (S2, EVC2), (S2, EVC4), (S3, EVC1), (S3, EVC2), and (S3, EVC4).

ND1 can also receive messages sent by nodes coupled to EVCs EVC1, EVC2, and EVC4. Accordingly, ND1 will receive messages from node ND2 via EVCs EVC1, EVC2, and EVC4 (or some other appropriate communication channel). These messages identify node ND2 and the subnets S2 and S3 configured on node ND2. In response to receiving the message from node ND2 via EVC1, node ND1 will add ND2 to the cells corresponding to (S2, EVC1) and (S3, EVC1). In response to receiving the message from node ND2 via EVC2, node ND1 will add ND2 to the cells corresponding to (S2, EVC2) and (S3, EVC2). In response to receiving the message from node ND2 via EVC4, node ND1 will add ND2 to the cells corresponding to (S2, EVC4) and (S3, EVC4).

Node ND1 will also receive similar messages from node ND3 via EVCs EVC1, EVC2, and EVC4 (or some other appropriate communication channel). ND3 is configured with subnets S2, S3, and S4. When node ND1 receives messages from node ND3, node ND1 can add a row corresponding to subnet S4 to the global SEI table (since subnet S4 is not configured on ND1, this subnet may have been omitted from the first version of the table constructed by node ND1). In response to the messages from node ND3, node ND1 will add ND3 to the cells corresponding to (S2, EVC1), (S2, EVC2), (S2, EVC4), (S3, EVC1), (S3, EVC2), (S3, EVC4), (S4, EVC1), (S4, EVC2), and (S4, EVC4).

Node ND1 receives messages from node ND4 via EVCs EVC1 and EVC4. ND4 is interested in assigning subnets S1, S2, and S4. Accordingly, node ND1 will add ND4 to the cells corresponding to (S1, EVC1), (S1, EVC4), (S2, EVC1), (S2, EVC4), (S4, EVC1), and (S4, EVC4).

Node ND1 is not coupled to EVC3 (i.e., EVC3 is not locally available at ND1), and thus node ND1 does not initially receive any information related to EVC3. However, EVC3 is locally available to nodes ND2, ND3, and ND4. Accordingly, one or more of these three nodes can collect information (e.g., by exchanging messages with the other nodes coupled by EVC3) about EVC3 and forward that information to node ND1 in a subsequent message via an EVC (or other appropriate communication channel) that is locally available to node ND1. For example, node ND2 can send information identifying the topology of EVC3 (in terms of which nodes are coupled by EVC3 and which subnets those nodes can potentially assign to EVC3) to node ND1 via EVC1. Thus, ND1 can receive information indicating the topology of EVC3 and add that information to the global SEI table.

In response to receiving a message identifying an EVC that is not locally available to node ND1, node ND1 can create a column in the global SEI table corresponding to that EVC, and the information identifying the topology associated with that EVC can then be stored in the newly-created column. Accordingly, node ND1 can create a column corresponding to EVC3 which indicates that ND4 is interested in assigning S1 to EVC3, ND2, ND3, and ND4 are interested in assigning S2 to EVC3, ND2 and ND3 are interested in assigning S3 to EVC3, and ND3 and ND4 are interested in assigning S4 to EVC3.

As will be shown in more detail below, the subnets that are candidates to be assigned to a particular EVC need not be of interest to all the nodes attached to UNIs associated by that particular EVC. In other words, even though an EVC may be available at a UNI to which a node is attached, that node may ultimately not assign an IP subnet that EVC (e.g., because other nodes have assigned a subnet to that EVC and the assigned subnet is not configured on the node).

In some embodiments, a node can perform error checking by examining the cell entries within the node's SEI table. Since all nodes that are interested in assigning a particular subnet will also receive messages relating to that subnet on the same set of EVCs, the cell entries should contain the same information. If the number of node identifiers per cell has a maximum number n across a row, and two or more cells have the value n, then these cells should contain the same node identifiers. If the cells do not, an error has occurred and the situation should be flagged. For example, in the row corresponding to subnet S3 in the SEI table of FIG. 4A, the maximum number n of node identifiers per cell is four (based upon the contents of the cells corresponding to (S2, EVC1) and (S2, EVC4)). Since there are two cells that have the maximum number n of node identifiers, node ND1 can perform error checking by comparing the node identifiers within each of those two cells. Here, the node identifiers in the two cells are identical, and thus no error will be detected. If instead the cell corresponding to (S2, EVC1) had identified another node ND5 instead of ND1, not all of the node identifiers would have matched those in the cell corresponding to (S2, EVC4) and node ND1 would, based upon the contents of these cells, detect that an error had occurred.

FIG. 5 illustrates a maximal SEI (MSEI) table. Like the SEI table of FIG. 4, this MSEI table can be generated by a subnet assignment module within each node and stored, at least temporarily, as part of the state information maintained by that node.

The MSEI table identifies EVC and subnet pairs (as represented by cells within the SEI table) that are candidates for being associated with a maximal set of node identifiers. As shown in FIG. 4, each cell within an SEI table can contain one or more node identifiers. A set of node identifiers is maximal if that set contains the node identifiers of the greatest number of nodes that have been configured with a given subnet, among all cells in a row of the SEI table.

The MSEI table contains cells corresponding to each cell in the SEI table, such that for each cell in the SEI table, there is a corresponding cell in the MSEI table. Once a node has established its global SEI table, the node can generate the global MSEI table by identifying the cells in each row of the SEI table that contain the greatest number of node identifiers of cells in the row. The cells in the MSEI table corresponding to those SEI cells with the greatest number of node identifiers will have a value of one (1); other cells will have a value of zero (0). The MSEI Table identifies the EVCs that are candidates to be assigned to a particular subnet.

As shown in FIG. 4, the cells corresponding to (S1, EVC1) and (S1, EVC4) have the greatest number of node identifiers in the first row of the global SEI table. These cells each contain two node identifiers, while the cells corresponding to (S1, EVC2) and (S1, EVC3) each only contain one node identifier. Accordingly, the node will place a one (1) in the cells of the MSEI table corresponding to (S1, EVC1) and (S1, EVC4) and a zero (0) in the cells of the MSEI table corresponding to (S1, EVC2) and (S1, EVC3).

The node generates the values for the second row of the global MSEI table, which corresponds to subnet S2. As shown in FIG. 4, the greatest number of node identifiers are found in the cells corresponding to (S2, EVC1) and (S2, EVC4) of the row corresponding to subnet S2 in the SEI table. Accordingly, the node places a one (1) in the corresponding cells of the MSEI table, and a zero (0) in the cells corresponding to (S2, EVC2) and (S2, EVC3).

The node also generates the values for the third row of the global MSEI table, which corresponds to subnet S3. As shown in FIG. 4, the greatest number of node identifiers are found in the cells corresponding to (S3, EVC1), (S3, EVC2), and (S3, EVC4) of the row corresponding to subnet S3 in the SEI table. Accordingly, the node places a one (1) in the corresponding cells of the MSEI table, and a zero (0) in the cell corresponding to (S3, EVC3).

The node generates the values for the final row of the MSEI table based upon the row of the SEI table that corresponds to subnet S4. As shown in FIG. 4, the cells of this row of the SEI table corresponding to (S4, EVC1), (S4, EVC3), and (S4, EVC4) contain the same number (two (2)) of node identifiers, and thus all three corresponding cells of the MSEI table will contain the value one (1). The remaining cell, which corresponds to (S4, EVC2) contains the value zero (0).

It is noted that, in some situations, the cell with the highest number of entries in a row of an SEI table may not actually correspond to a maximal set of node identifiers. This situation can arise if the network topology does not provide EVCs that satisfy the connectivity requirements of the subnets configured by the customer.

Figure 6:
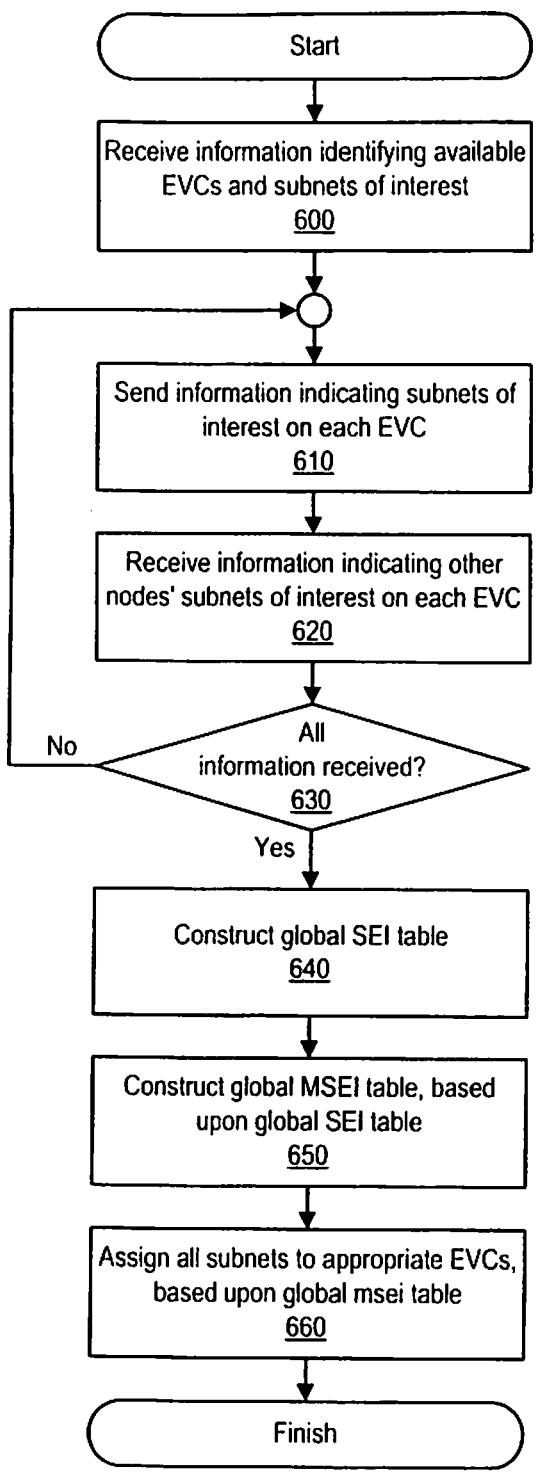
FIG. 6 is a flowchart of a method of automatically assigning an IP subnet to an EVC, according to one embodiment of the present invention.

FIG. 6 is a flowchart of a method of assigning IP subnets to EVCs, based upon information identifying the global topology of a MEN. Such a method can be performed by a subnet assignment module of a node.

The method begins at 600, when information identifying available EVCs and subnets of interest is received. The subnets of interest can be identified when an administrator configures those subnets on the node that includes the subnet assignment module. The available EVCs can also be manually configured; however, in many embodiments, an automatic discovery protocol such as E-LMI can be used to obtain this information automatically.

In some embodiments, prior to proceeding with this method, the subnet assignment module can check for errors. For example, if there are more subnets to be assigned than there are EVCs available, an error should be signaled. The subnet assignment module can count the number of subnets to be assigned as well as the number of active EVCs. If the number of subnets of interest is greater than the number of available EVCs, an error condition must be declared.

At 610, the subnet assignment module sends information identifying the subnets of interest to one or more other nodes (e.g., by sending messages containing that information via each locally available EVC or other appropriate communication channel). The subnet assignment module receives similar information from one or more other nodes (e.g., by receiving messages containing such information via each locally available EVC or other appropriate communication channel), as shown at 620. It is noted that the received information can include information identifying EVCs that are not locally available to the receiving node and/or IP subnets that are not configured on the receiving node.

The subnet assignment module should also detect an error condition if all of the nodes that are interested in the same subnet are not associated by at least one common EVC, and thus the subnet assignment module can check the information received at 620 to determine whether this situation has occurred.

At 630, the subnet assignment module determines whether all information (e.g., enough information to identify the global topology of the network, including all active EVCs and all configured subnets) has been received. In one embodiment, this determination can be made by comparing the number of unchanged messages received from other nodes to a threshold value (e.g., a large constant). If the number of unchanged messages exceeds the threshold, the subnet assignment module determines that all available information has been received, the subnet assignment module can proceed by constructing a global SEI table, as shown at 640.

If the subnet assignment module cannot yet determine that all of the available information has been received, the subnet assignment module can continue to send and/or receive topology information by repeating operations 610 and/or 620. Each time the subnet assignment module updates its local version of the topology information, the subnet assignment module can send the updated version to one or more other nodes.

When constructing the global SEI table, the subnet assignment module creates a row (or column) corresponding to each IP subnet identified at either 600 or 620 and a column (or row) corresponding to each EVC identified at either 600 or 620. Each cell in the global SEI table identifies which nodes, if any, are interested in assigning a particular IP subnet to a particular EVC. A node is interested in assigning an IP subnet to an EVC if that EVC is locally available on the node and the IP subnet has been configured on the node.

At 650, the subnet assignment module constructs a global MSEI table, based upon the global SEI table. The global MSEI table has cells corresponding to each cell in the global SEI table. The value of each cell in the global MSEI table is 1 if the corresponding cell in the global SEI table identifies a maximal number of nodes and 0 otherwise.

At 660, the subnet assignment module uses a prespecified algorithm to assign the IP subnets to appropriate EVCs, using the global MSEI table. For example, the subnet assignment module can use either the entropy-based technique (described in more detail with respect to FIGS. 7 and 8 below) or the tree-based technique (described in more detail with respect to FIGS. 9A-9G and 10 below) to generate the assignments.

Figures 7, 8:
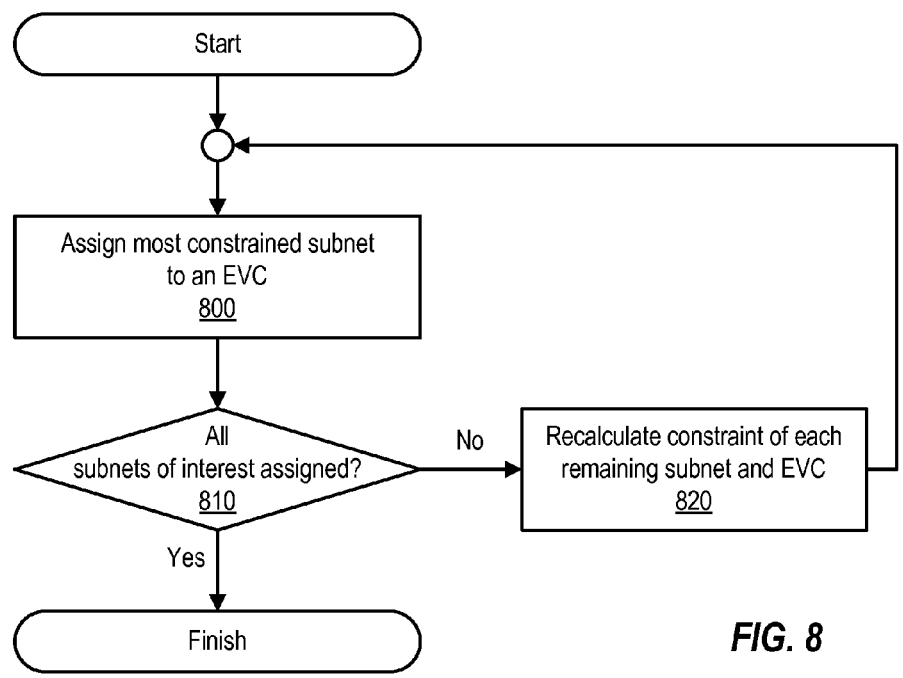
FIG. 7 illustrates an expanded MSEI table that can be generated by each of the four nodes of FIG. 2, according to one embodiment of the present invention.
FIG. 8 is a flowchart of a method of assigning IP subnets to EVCs, based upon an expanded MSEI table like that shown in FIG. 7, according to one embodiment of the present invention.

FIG. 7 illustrates an expanded MSEI table that can be generated by a subnet assignment module when using the entropy-based technique to assign IP subnets to EVCs. In this example, the subnet assignment module sums the cells in each row to obtain a subnet (S) entropy value and the cells in each column to obtain an EVC (E) entropy value. In this example, the S entropy value is two (2) for the first row. Since only cells corresponding to maximal sets of router identifiers have a non-zero entry (i.e., one (1)), adding up the cell values along a row is the same as counting the number of appropriate EVCs for a given subnet. Accordingly, the S entropy identifies the number of EVCs that satisfy the requirements of the associated subnet. The S entropy for the second row is also two (2). The S entropy for the third row will be three (3). Similarly, the S entropy for the fourth row will be two (2).

The subnet assignment module first selects the subnet having the lowest S entropy. For the selected subnet, the subnet assignment module selects the candidate EVC having the lowest E entropy. The subnet assignment module then assigns the selected IP subnet to the selected EVC.

FIG. 7 shows two subnets, S1 and S2, with the lowest S entropy in the expanded MSEI table. When multiple subnets are equally constrained, the subnet identifiers can be unambiguously sorted (e.g., numerically, alphabetically, or as otherwise appropriate given the format of the subnet identifiers), such that one subnet can be identified as being lower or higher (or before or after, or lesser or greater, and so on) relative to another subnet. EVC identifiers can be sorted in a similarly appropriate manner. Each subnet assignment module within each node is configured to sort subnet and EVC identifiers in the same manner. Accordingly, these identifiers can be used as tiebreakers when multiple subnets are equally constrained.

In this example, nodes are configured to prioritize selection of the lowest subnets and the lowest EVCs. However, it is noted that other selection techniques can be used in other embodiments. In this example, since S1 and S2 are equally constrained (as indicated by each of these subnets having an S Entropy of two (2)), the subnet assignment module selects the lowest subnet identifier, S1. The subnet assignment module then selects the EVC that satisfies subnet S1's requirements and that also has the lowest E entropy. As shown in FIG. 7, EVCs EVC1 and EVC4 both satisfy S1's requirements and both have the same E entropy (four (4)). Accordingly, the subnet assignment module can select the lowest EVC (EVC1). The subnet assignment module then assigns S1 to EVC1.

Once a subnet has been assigned to an EVC, both the subnet and the EVC to which the subnet was assigned can be removed from the expanded MSEI tables (or otherwise ignored for purposes of subsequent assignments). In some embodiments, these subnets and EVCs are effectively removed by replacing their entropy values with a value, such as "A", that indicates that the subnets and EVCs have been assigned. The subnet assignment module can then recalculate the S and E entropy values in the modified expanded MSEI table. Based upon the new S and E entropy values, the subnet assignment module can then generate the next assignment. This process repeats until all of the identified subnets have been assigned.

In the example shown in FIG. 7, removing S1 and EVC1 from the expanded MSEI table effectively removes the first row and the first column of the table. The recalculated S entropies will be one (1) for S2 (since EVC1 is no longer a candidate EVC for S2) and two (2) for S3 and S4 (since EVC1 is no longer a candidate EVC for S3 and S4). The recalculated E entropies will be one (1) for EVC2, one (1) for EVC3, and three (3) for EVC4 (since S1 is no longer a candidate for assignment to EVC4). Accordingly, in the next iteration, S2 will be assigned to EVC4. Continuing this algorithm for the example shown in FIG. 7, the subnet assignment module will assign S3 to EVC2 and S4 to EVC3.

If, during the assignment process, any subnet ends up with an S entropy of zero (0), it means that there is no EVC that can satisfy the requirements of this subnet. Accordingly, if the subnet assignment module detects an S entropy of an unassigned subnet that equals zero, that subnet assignment module will signal an error condition (e.g., by logging the error, causing a instant message, text message, email, or the like to be sent to an administrator, causing an error indicator to light up, displaying an error message on a display screen, and/or any other desired form of reporting errors).

FIG. 8 is a flowchart of a method of automatically assigning one or more IP subnets to one or more EVCs using an entropy-based technique and information identifying the global topology of the MEN. This method can be performed by a subnet assignment module such as the one shown in FIG. 3.

The method begins by assigning the most constrained subnet to an EVC that satisfies the connectivity requirements of the most constrained subnet, as shown at 800. As described above, there may be situations in which several subnets are equally constrained, and thus a prespecified algorithm (such as selecting the lowest subnet) can be used to select the most constrained subnet. Similarly, if there are multiple EVCs that are candidates to be assigned to the most constrained subnet, a prespecified algorithm can be used to select the EVC for the assignment. Once a subnet of interest has been assigned to an EVC, the subnet assignment module that made the assignment can use ARP to obtain the IP address to MAC address binding of remote nodes coupled by that EVC.

After the assignment has been made, the subnet assignment module can recalculate the constraints of each remaining subnet and EVC, as shown at 820, and assign the next most constrained subnet by repeating operation 800. This process can repeat until all of the subnets have been assigned, as determined at 810. Each time these operations are repeated, the subnet assignment module can recalculate the relative constraint (e.g., entropy) of each subnet and each EVC. The recalculated relative constraints take into account any increased constraints that resulted from a prior assignment of a subnet to an EVC.

As an alternative to the entropy-based assignment technique described with respect to FIGS. 7 and 8, a subnet assignment module can use a tree-based technique to generate the assignments. FIGS. 9A-9G illustrate how a tree corresponding to a MSEI table can be constructed by a subnet assignment module.

In this embodiment, $T_{ij}$ represents each entry in the MSEI table with i=1, ..., m and j=1, ..., n and $T_{ij}$=0 or 1. The subnets are labeled according to their numerical order as $S_1, \ldots, S_m$ where $S_1$ is the lowest in numerical order. Similarly, the EVCs are labeled as $E_1, \ldots, E_n$ according to their numerical order, where $E_1$ is the lowest in numerical order. $M(S_i) \equiv \{k | T_{ik}=1\}$ identifies the set of labels of the EVCs that are candidates for the Subnet.

An inverted tree with levels 0 (top) to m (bottom) is then constructed. The level 0 tree node of the tree is a convenience and does not actually correspond to any cell in the MSEI table; instead, this level 0 tree node allows a single tree node to act as the ancestor of all other tree nodes in the tree.

The level 1 tree nodes are children of the root (i.e., the level 0 tree node) and have labels $\langle S_1, E_j \rangle \; \forall j \in M(S_1)$. For a given tree node at level 1, we denote the label for the tree node as $\langle S_1, E(S_1) \rangle$.

Each level 2 tree node is a child of a level 1 tree node. For each level 1 tree node, $\langle S_1, E(S_1) \rangle$, the child tree nodes will have labels $\langle S_1, E(S_1) \rangle \langle S_2, E_j \rangle \; \forall j \in \{M(S_2) \backslash E(S_1)\}$, where the backslash notation, A\B, indicates the set A with the elements of B removed from it. In other words, each label for a level 2 tree node includes of the label of its parent concatenated with a pair consisting of the subnet for level 2 and a potential EVC to which to assign the subnet.

Similarly, for a given tree node at level k, the label for the tree node is denoted as $\langle S_1, E(S_1) \rangle \langle S_2, E(S_2) \rangle, \ldots, \langle S_k, E(S_k) \rangle$. Each level k tree node is a child of a level k−1 tree node. For each parent tree node, $\langle (S_1, E(S_1)) \rangle, \ldots \langle (S_{k-1}, E(S_{k-1})) \rangle$, the child tree nodes will have labels $\langle S_1, E(S_1) \rangle, \ldots \langle S_{k-1}, E(S_{k-1}) \rangle \langle S_k, E_j \rangle \; \forall j \in \{M(S_k) \backslash \{E(S_1), \ldots, E(S_{k-1})\}\}$.

A tree node at level k<m need not have any child tree nodes because the set $M(S_k) \backslash \{E(S_1), \ldots, E(S_{k-1})\}$ can be empty. This means that the assignment of subnets to EVCs implied by the label of this tree node cannot be part of a complete solution.

If a tree node exists at level m, its label specifies a correct assignment of subnets to EVCs. If there are no tree nodes at level m, then there is no way to assign all of the subnets to EVCs. Since each subnet assignment module has the same MSEI table, each subnet assignment module can calculate the same set of feasible assignments. To have each subnet assignment module select the same assignments, it is sufficient to have each find the same level m tree node. In the following algorithm, each subnet assignment module is configured to find the "leftmost" level m tree node of the tree.

A level m tree node is defined as a solution tree node. Its solution vector is defined to be its label. A level j<m tree node is defined as a solution tree node if it has at least one child tree node that is a solution tree node. Its solution vector is defined as the solution vector of the solution child tree node with the label ⟨$S_1,E(S_1)$⟩, ..., ⟨$S_j,E(S_j)$⟩,⟨$S_{j+1},E_{\bar{k}}$⟩
where
$\bar{k}=\min\{k|k\in\{1,...,n\}$ and ⟨$S_{j+1},E_k$⟩ is in the label of a solution tree node at level j+1}. In other words, the leftmost child solution tree node provides the solution vector to the parent tree node.

Consider a tree node at level j with label ⟨$S_1,E(S_1)$⟩, ..., ⟨$S_j,E(S_j)$⟩. Denote the child tree node labels, if any, as ⟨$S_1,E(S_1)$⟩, ..., ⟨$S_j,E(S_j)$⟩,⟨$S_{j+1},E_{j_1}$⟩, ⟨$S_1,E(S_1)$⟩, ..., ⟨$S_j,E(S_j)$⟩,⟨$S_{j+1},E_{j_2}$⟩, ..., ⟩$S_1,E(S_1)$⟨, ..., ⟩$S_j,E(S_j)$⟩,⟨$S_{j+1},E_{j_p}$⟩ where $j_1<j_2<...<j_p$. If j=m, the tree node is a solution tree node and its solution vector is just its label. If j<m, each child tree node can be examined to find the child solution tree node, if any, with the smallest value from $\{j_1,j_2,...,j_p\}$. If no such child solution tree node exists, the tree node being checked is not a solution tree node. If such a child solution tree node is found, the tree node being checked is a solution tree node and its solution vector is that of the selected child solution tree node. The algorithm can then simply to check the root tree node to see if it is a solution tree node. If it is a solution tree node, its label is the sought after solution vector.

Note that to check a tree node at a level less than m requires checking one or more child tree nodes beginning with the leftmost child tree node. Thus, the check process in the above algorithm could be implemented as a re-entrant process. Furthermore, when checking a tree node, the child tree nodes can be constructed as needed from the MSEI Table and the knowledge of which EVCs are present in the label of the tree node being checked. This means that it will rarely be necessary to construct the full MSEI Tree in order to find a correct assignment of subnets to EVCs.

Figure 9A:
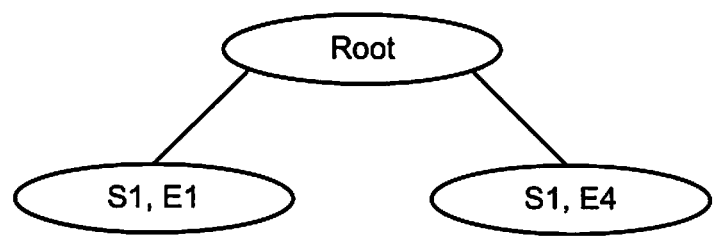
FIGS. 9A-9G illustrate how a tree can be constructed, based upon an MSEI table like that shown in FIG. 5, according to one embodiment of the present invention.

FIG. 9A shows the MSEI table of FIG. 5, along with the first two levels of an inverted tree corresponding to the MSEI table. As noted above, the root of the inverted tree does not correspond to any cell of the MSEI table. The level 1 tree nodes (S1, E1) and (S1, E4) correspond to respective cells in the first row of the MSEI table that have a value of 1. In particular, the leftmost tree node (S1, E1) corresponds to the first cell of the first row of the MSEI table, while the rightmost tree node (S1, E4) corresponds to the last cell of the first row of the MSEI table. Note that the full labels for the tree nodes are not shown in FIGS. 9A-9G for graphical simplicity.

Figure 9B:
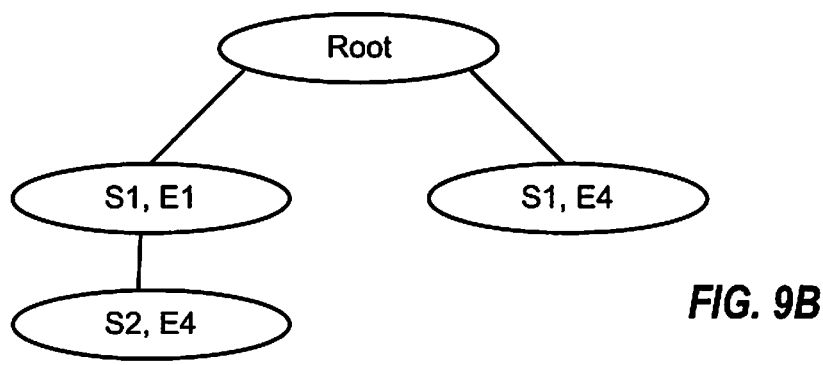

In FIG. 9B, the subnet assignment module adds a branch from the leftmost level 1 tree node to a level 2 tree node of the partially constructed inverted tree. To select a cell of the MSEI table on which to base the level 2 tree node, the subnet assignment module effectively ignores any columns of the MSEI table that correspond to tree nodes in prior levels of the same path. Thus, since the leftmost level 1 tree node corresponds to the first column of the MSEI table, that column is ignored when generating the level 2 tree node. This tree node (S2, E4) corresponds to the only cell in the second row of the MSEI table having a value of 1 (the last cell in the second row), since the first column is being ignored.

Figure 9C:
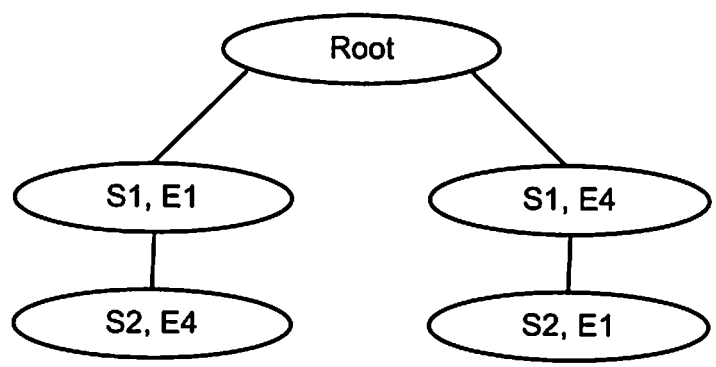

FIG. 9C shows how subnet assignment module adds a branch from the rightmost level 1 tree node to another level 2 tree node of the partially constructed inverted tree. Here, instead of ignoring the first column (as was done when adding a tree node to the leftmost path), the subnet assignment module ignores the last column, since the rightmost level 1 tree node corresponds to the EVC associated with the last column. Accordingly, once the last column is ignored, there is only one cell in the second row of the MSEI table having a value of 1. A tree node (S2, E1) corresponding to this cell is thus added to the rightmost path of the tree.

Figure 9D:
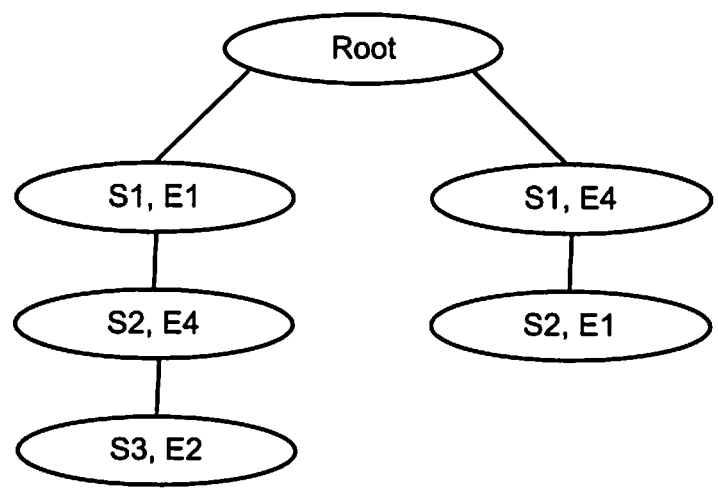

In FIG. 9D, the subnet assignment module adds path from the leftmost level 2 tree node to a tree node at level 3. Here, the columns of the MSEI table that correspond to the nodes at levels 1 and 2 of the path leading from the new tree node to the root are ignored. Accordingly, the only remaining cell having a value of 1 in the third row of the MSEI table is the second cell in the third row. A tree node (S3, E2) corresponding to this cell is thus added to the partially constructed inverted tree.

Figure 9E:
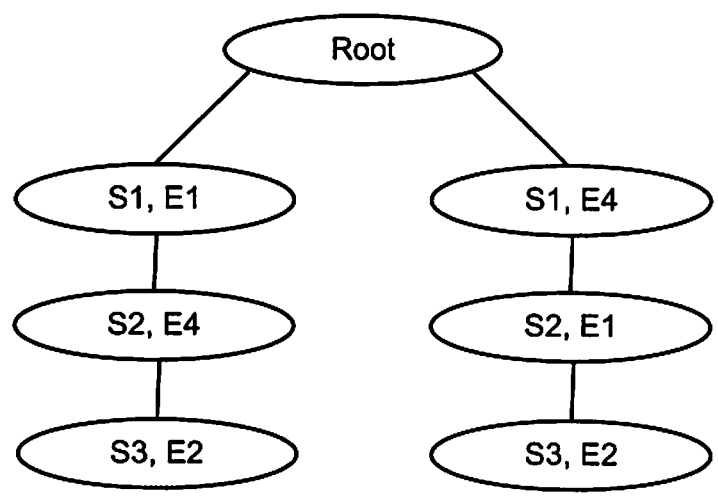

In FIG. 9E, the subnet assignment module adds a branch from the rightmost level 2 tree node to a tree node at level 3. Here, the columns of the MSEI table that correspond to the nodes at levels 1 and 2 of the path leading from the new tree node to the root of the tree are ignored. Accordingly, the only remaining cell having a value of 1 in the third row of the MSEI table is the second cell in the third row. A tree node (S3, E2) corresponding to this cell is thus added to the partially constructed inverted tree.

Figure 9F:
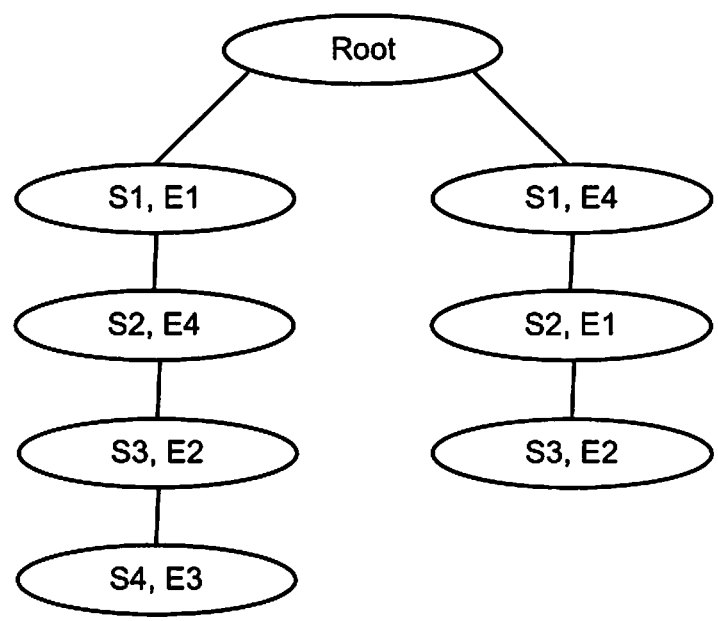

FIG. 9F shows how the subnet assignment module can add a branch from the leftmost level 3 tree node to a tree node corresponding to the fourth row of the MSEI table at level 4 of the partially constructed inverted tree. The first, second, and fourth columns of the MSEI table are ignored, since these columns are represented in levels 1-3 of the path leading from the new tree node to the root. Accordingly, the only remaining cell having a value of 1 in the fourth row of the MSEI table is the third cell of the fourth row. A tree node (S4, E3) corresponding to this cell is thus added to the partially constructed inverted tree.

Figure 9G:
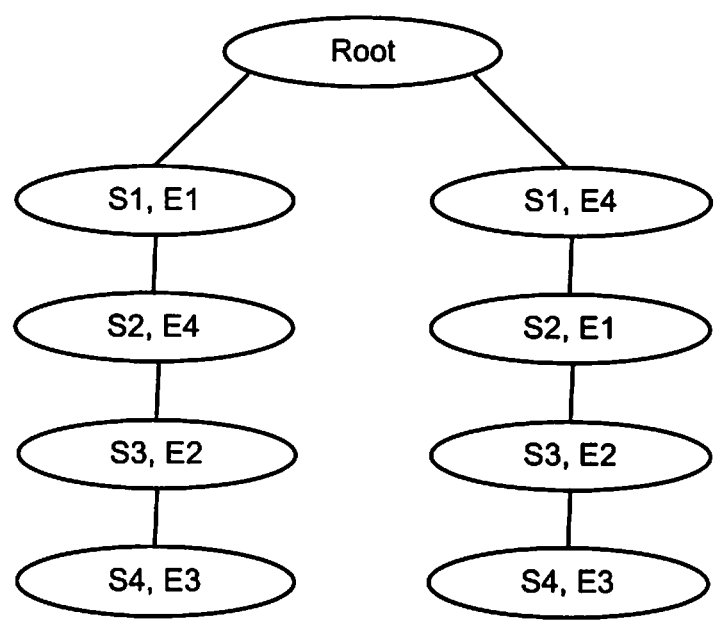

FIG. 9G shows how the subnet assignment module can add a branch from the rightmost level 3 tree node to a tree node corresponding to the fourth row of the MSEI table. The first, second, and fourth columns of the MSEI table are ignored, since these columns are represented in levels 1-3 of the path leading from the new tree node to the root. Accordingly, the only remaining cell having a value of 1 in the fourth row of the MSEI table is the third cell of the fourth row. A tree node (S4, E3) corresponding to this cell is thus added to the partially constructed inverted tree.

In this example, there are two paths from the root to level 4 and each path represents a complete solution. Accordingly, the subnet assignment module can select one path (e.g., the leftmost path) and generate assignments based upon the tree nodes in the selected path. In order to guarantee that the assignments are consistent with those made by other nodes (if any), a prespecified algorithm can be used to select one of the paths. Alternatively, the subnet assignment module can be configured to generate paths serially (e.g., first the leftmost path, then the next leftmost path, and so on) until a path that reaches level 4, and thus represents a complete solution, is generated.

Figure 10:
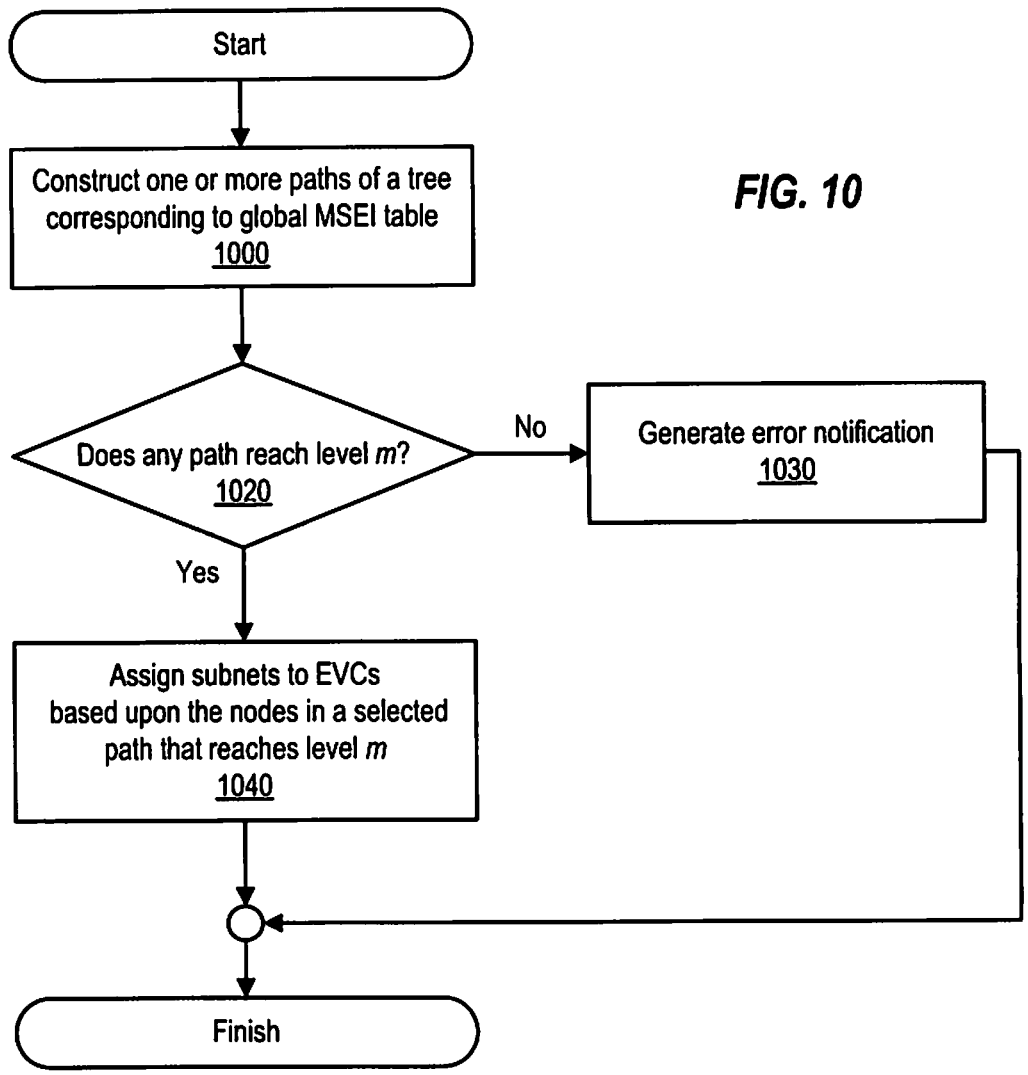
FIG. 10 is a flowchart of a method of assigning IP subnets to EVCs, based upon a tree such as the one constructed in FIGS. 9A-9G, according to one embodiment of the present invention.

FIG. 10 is a flowchart of a method of assigning IP subnets to EVCs using a tree-based approach. This method can be performed by a subnet assignment module like the one shown in FIG. 3.

The method begins at 1000, when the subnet assignment module constructs one or more paths of a tree that corresponds to a global MSEI table (or other information identifying the relative constraints of each subnet). Construction of the path(s) of the tree can be performed using the techniques described above with respect to FIGS. 9A-9G, in one embodiment. Paths can be constructed serially or in parallel.

The subnet assignment module determines (1020) whether any of the paths reach level m of the tree, where m is the number of subnets to be assigned. In other words, the subnet assignment module determines whether any of the paths represents a complete solution. In one embodiment, this determination can be made by simply checking to see which path(s) include m levels. If no path represents a complete solution, the subnet assignment module can generate an error notification, as shown at 1030. If multiple paths represent complete solutions, the subnet assignment module can select one such path, as described above.

If a suitable path is detected at 1020, the subnet assignment module uses the information in each tree node of the selected path to assign IP subnets to EVCs, as shown at 1040. In particular, for each tree node, the subnet assignment module assigns the identified IP subnet to the identified EVC.

Figure 11:
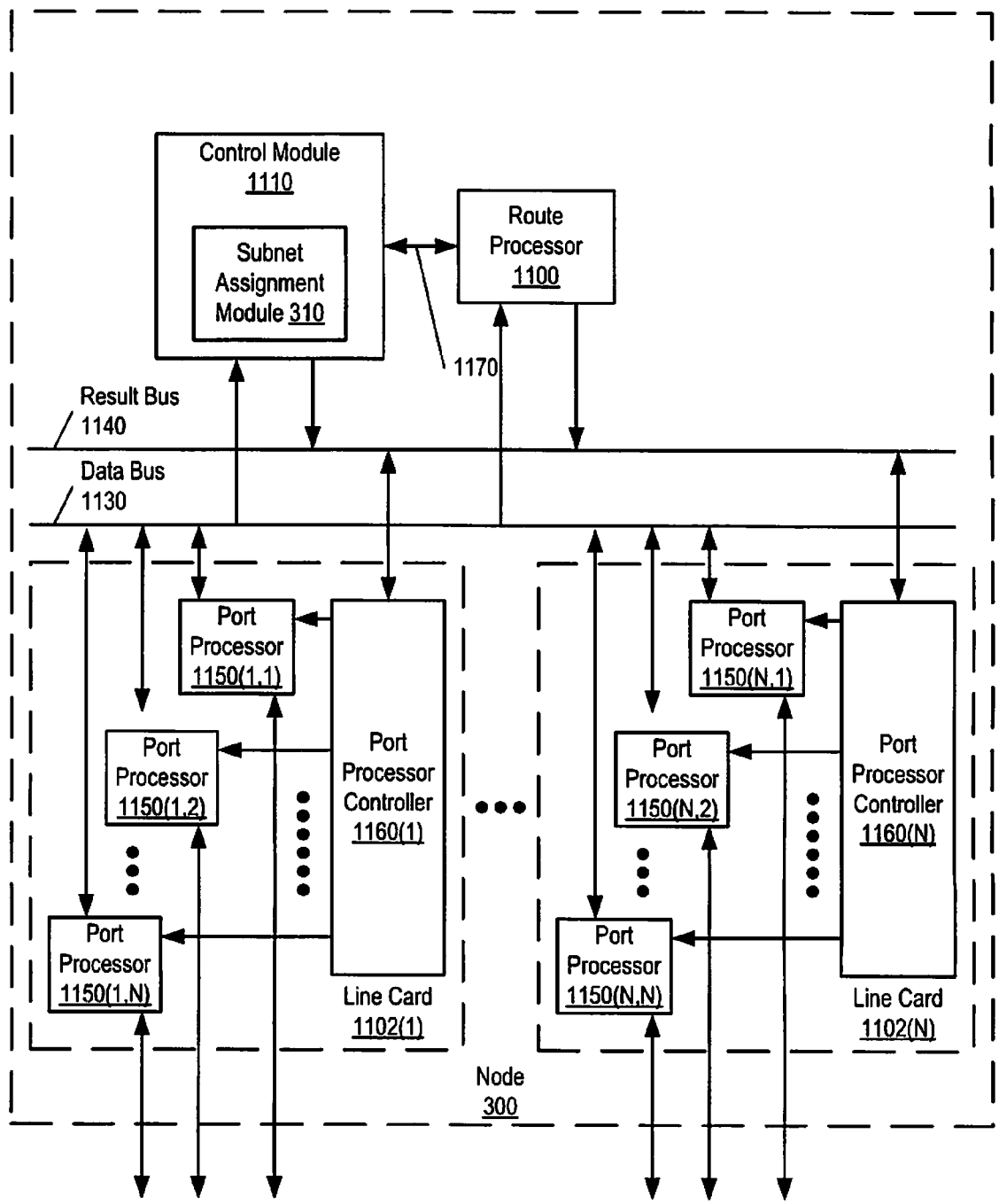
FIG. 11 is a block diagram of a node that is configured to automatically assign an IP subnet to an EVC, according to one embodiment of the present invention.

FIG. 11 is a block diagram of a node that is configured to automatically assign one or more IP subnets to one or more EVCs, based upon global topology information for the MEN. FIG. 11 illustrates a node 300 (e.g., one of nodes ND1-ND4 of FIG. 2 or node 300 of FIG. 3). In this depiction, node 300 includes a number of line cards (line cards 1102(1)-1102(N)) that are communicatively coupled to a control module 1110 (which can include subnet assignment module 310, as shown) and a route processor 1100 via a data bus 1130 and a result bus 1140. Line cards 1102(1)-1102(N) include a number of port processors 1150(1,1)-1150(N,N) which are controlled by port processor controllers 1160(1)-1160(N). It will also be noted that control module 1110 and route processor 1100 are not only coupled to one another via data bus 1130 and result bus 1140, but are also communicatively coupled to one another by a communications link 1170.

When a message (e.g., an E-LMI message or a message containing topology information generated by another node) is received, the message is identified and analyzed by a node 300 in the following manner, according to embodiments of the present invention. Upon receipt, a message (or some or all of its control information) is sent from one of the port processors 1150(1,1)-1150(N,N) at which the discovery message was received to one or more of those devices coupled to data bus 1130 (e.g., others of port processors 1150(1,1)-1150(N,N), a forwarding engine, and/or route processor 1100). Handling of the message can be determined, for example, by control module 1110. For example, control module 1110 may determine that the message should be processed by subnet assignment module 310.

Figure 12:
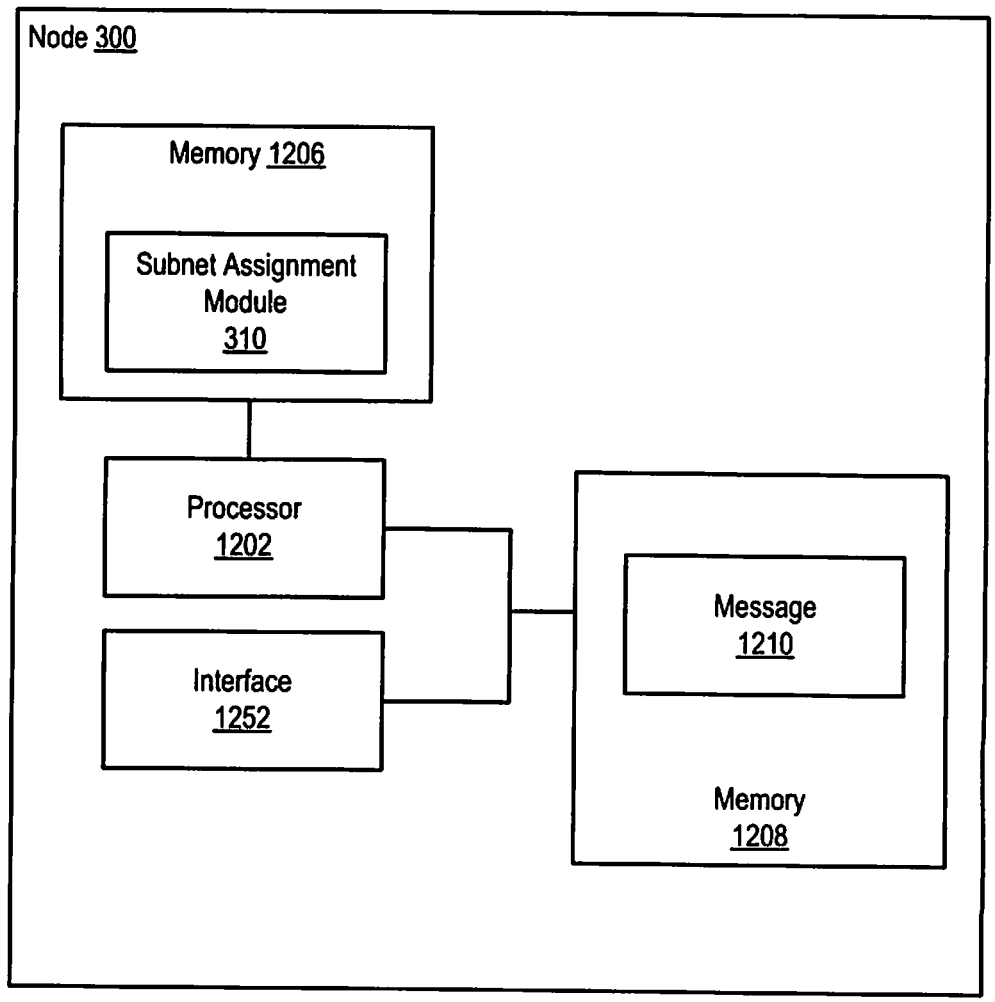
FIG. 12 is another block diagram of a node that is configured to automatically assign an IP subnet to an EVC, according to one embodiment of the present invention.

FIG. 12 is another block diagram of a node that is configured to automatically assign an IP subnet to an EVC, based upon global topology information. FIG. 12 illustrates how at least a portion of subnet assignment module 310 can be implemented in software. FIG. 12 shows a node 300, which is a device that can process IP information (e.g., a router, server, switch, or bridge, or the like, that has appropriate IP processing modules). As illustrated, node 300 includes one or more processors 1202 (e.g., microprocessors, PLDs (Programmable Logic Devices), or ASICs (Application Specific Integrated Circuits)) configured to execute program instructions stored in memories 1206 and/or 1208. Memories 1206 and 1208 can include various types of RAM (Random Access Memory), ROM (Read Only Memory), Flash memory, MEMS (Micro Electro-Mechanical Systems) memory, and the like. Node 300 also includes one or more interfaces 1252 (e.g., one or more hardware ports or other network interfaces that can be linked to other network devices, hosts, servers, storage devices, or the like). Processor 1202, interface 1252, and memories 1206 and 1208 are coupled to send and receive data and control signals by one or more buses or other interconnects.

In this example, program instructions executable to implement subnet assignment module 310 are stored in memory 1206. A message 1210 that has been received via interface 1252 can be stored in memory 1208 for processing by subnet assignment module 310. Such a message can be an E-LMI message or a message used to exchange topology information with other subnet assignment modules.

It is noted that the program instructions and/or data executable to implement subnet assignment module 310 can be stored on various computer readable media such as a memory (e.g., RAM (Random Access Memory)). In some embodiments, such software is stored on a computer readable medium such as a CD (Compact Disc), DVD (Digital Versatile Disc), hard disk, optical disk, tape device, floppy disk, and the like). In order be executed, the software is loaded into memory from another computer readable medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present invention has been described with respect to specific embodiments thereof, various changes and modifications may be suggested to one skilled in the art. It is intended such changes and modifications fall within the scope of the appended claims.

What is claimed is:

1. A method comprising:
   receiving information identifying one or more active virtual connections (VCs) of a plurality of active VCs available within a network and one or more IP subnets of a plurality of IP subnets configured on a plurality of nodes, wherein
      the information is received by a first node of the plurality of nodes coupled by the network,
      each of the plurality of nodes is coupled to at least one active VC,
      at least one node of the plurality of nodes is coupled to two or more active VCs, and
      the information comprises a first set of information and a second set of information,
      the first set of information is received in a first message from a second node of the plurality of nodes, and the first set of information identifies the second node and at least one of:
         a first VC that is not locally available at the first node, and
         a first IP subnet that is not configured on the first node,
      the second set of information is received from service provider equipment in one or more protocol messages and identifies at least one of:
         a second VC that is locally available to the first node, and
         a second IP subnet that is configured on the first node;
   sending a second message comprising information identifying the first node and the second set of information to the second node;
   generating information identifying a global topology of the network, based upon the received information, wherein
      the global topology comprises each of the plurality of active VCs within the network and each of the plurality of IP subnets configured on the plurality of nodes;
   assigning one IP subnet of the plurality of IP subnets to one active VC of the plurality of active VCs, based upon the global topology of the network, wherein
      the global topology indicates that the one active VC couples all nodes that are configured with the one IP subnet,
      the generating, the sending, and the assigning are performed by the first node,
      the assigning the one IP subnet to the one active VC is performed according to an algorithm, and the second node is also configured to assign the one IP subnet to the one active VC according to the algorithm; and identifying which of the plurality of IP subnets is a most constrained IP subnet, based upon the information identifying the global topology, wherein
the information identifying the global topology is used to calculate a subnet entropy value for each of the plurality of IP subnets wherein
the subnet entropy value indicates how many active VCs satisfy the connectivity requirement of each IP subnet;

assigning the most constrained of the IP subnets to one of the plurality of active VCs that satisfies connectivity requirements of the most constrained one of the IP subnets; and repeating said identifying which of the plurality of IP subnets is the most constrained IP subnet and said assigning the most constrained one of the IP subnets for additional ones of the plurality of IP subnets, until all of the plurality of IP subnets are assigned.

2. The method of claim 1, wherein the generating the information identifying the global topology comprises generating a table identifying which of the plurality nodes are configured with each of the plurality of IP subnets as well as which of the plurality of nodes can communicate via each of the plurality of active VCs.

3. The method of claim 1, further comprising:
generating a tree, based upon the information identifying the global topology, wherein the tree includes one or more tree nodes, and wherein each tree node identifies one of the plurality of IP subnets and one of the plurality of active VCs that satisfies connectivity requirements of the identified one of the plurality of IP subnets.

4. The method of claim 3, further comprising:
verifying that the tree includes a path of tree nodes identifying each of the plurality of IP subnets; and
for each node in the path, assigning the identified one of the plurality of the IP subnets to the identified one of the plurality of active VCs.

5. The method of claim 1, wherein the network is a metro Ethernet network, and wherein the VCs are Ethernet virtual connections.

6. The method of claim 1, wherein the first node is configured with more than one IP subnet.

7. The method of claim 1, wherein the information is received by the first node on more than one locally available VC.

8. The method of claim 1, wherein each of the one or more active VCs couples a plurality of user-to-network interfaces (UNIs), wherein each of the one or more active VCs is either a multipoint-to-multipoint Ethernet VC or a rooted-multipoint Ethernet VC.

9. The method of claim 1, wherein the plurality of nodes update the global topology each time a local topology changes by sending one or more protocol messages to the second VC that is locally available to the first node.

10. The method of claim 1, wherein
the subnet entropy value for the most constrained IP subnet is a number of IP subnet-to-active VC pairs associated with the most constrained IP subnet that are also associated with a maximum number of nodes of the plurality of nodes, and
the subnet entropy value indicates the number of active VCs of the plurality of active VCs that satisfy the connectivity requirements of the most constrained IP subnet.

11. A node comprising:
an interface configured to receive information identifying one or more active virtual connections (VCs) of a plurality of active VCs available within a network and one or more IP subnets of a plurality of IP subnets configured on a plurality of nodes, wherein
the node is one of the plurality of nodes coupled by the network,
each of the plurality of nodes is coupled to at least one active VC,
at least one of the plurality of nodes is coupled to two or more active VCs, and
the information comprises a first set of information and a second set of information,
the first set of information is received in a first message from a second node of the plurality of nodes, and identifies the second node and at least one of:
a first VC that is not locally available at the node and
a first IP subnet that is not configured on the node,
the second set of information is received from service provider equipment in one or more protocol messages and identifies at least one of:
a second VC that is locally available to the first node and
a second IP subnet that is configured on the first node,
the interface is configured to send a second message comprising information identifying the first node and the second set of information to the second node; and
a subnet assignment module coupled to the interface and configured to:
generate information identifying a global topology of the network, based upon the received information, wherein the global topology comprises each of the plurality of active VCs within the network and each of the plurality of IP subnets configured on the plurality of nodes;
assign one IP subnet of the plurality of IP subnets to one active VC of the plurality of active VCs, based upon the global topology of the network, wherein the global topology indicates that the one active VC couples all nodes that are configured with the one IP subnet, and wherein assignment of the one IP subnet to the one active VC is performed according to an algorithm, and wherein the second node is also configured to assign the one IP subnet to the one active VC according to the algorithm;
identify which of the plurality of IP subnets is a most constrained IP subnet, based upon the information identifying the global topology, wherein the information identifying the global topology is used to calculate a subnet entropy value for each of the plurality of IP subnets wherein the subnet entropy value indicates how many active VCs satisfy the connectivity requirement of each IP subnet;
assign the most constrained of the IP subnets to one of the plurality of active VCs that satisfies connectivity requirements of the most constrained one of the IP subnets; and
repeat said identifying which of the plurality of IP subnets is the most constrained IP subnet and said assigning the most constrained one of the IP subnets for additional ones of the plurality of IP subnets, until all of the plurality of IP subnets are assigned.

12. The node of claim 11, wherein the subnet assignment module is configured to generate a table identifying which of the plurality nodes are configured with each of the plurality of IP subnets as well as which of the plurality of nodes can communicate via each of the plurality of active VCs.

13. The node of claim 11, wherein the subnet assignment module is further configured to:
- identify which of the plurality of IP subnets is a most constrained IP subnet, based upon the information identifying the global topology; and
- assign the most constrained IP subnets to one of the plurality of active VCs that satisfies connectivity requirements of the most constrained IP subnet.

14. The node of claim 13, wherein subsequent to assigning the most constrained IP subnet, the subnet assignment module is configured to identify a second-most constrained IP subnet of the plurality of IP subnets and to assign the second-most constrained IP subnet to one of the plurality of active VCs that satisfies connectivity requirements of the second-most constrained IP subnet.

15. The node of claim 11, wherein the subnet assignment module is configured to generate a tree, based upon the information identifying the global topology, wherein the tree includes one or more tree nodes, and wherein each tree node in the tree identifies one of the plurality of IP subnets and one of the plurality of active VCs that satisfies connectivity requirements of the identified one of the plurality of IP subnets.

16. The node of claim 15, wherein the subnet assignment module is further configured to verify that the tree includes a path of tree nodes identifying each of the plurality of IP subnets and, for each tree node in the path, to assign the identified one of the plurality of the IP subnets to the identified one of the plurality of active VCs.

17. The node of claim 11, wherein the network is a metro Ethernet network, and wherein the VCs are Ethernet virtual connections.

18. A first node of a plurality of nodes comprising:
- means for receiving information identifying one or more active virtual connections (VCs) of a plurality of active VCs available within a network and one or more IP subnets of a plurality of IP subnets configured on the plurality of nodes, wherein each of the plurality of nodes is coupled to at least one active VC, at least one node of the plurality of nodes is coupled to two or more active VCs, and
- the information comprises a first set of information and a second set of information, the first set of information is received in a first message from a second node of the plurality of nodes, and identifies the second node and at least one of:
  - a first VC that is not locally available at the first node and a first IP subnet that is not configured on the first node,
  - the second set of information is received from service provider equipment in one or more protocol messages and identifies at least one of:
  - a second VC that is locally available to the first node and a second IP subnet that is configured on the first node;
- means for sending a second message comprising information identifying the first node and the second set of information to the second node;
- means for generating information identifying a global topology of the network, based upon the received information, wherein the global topology comprises each of the plurality of active VCs within the network and each of the plurality of IP subnets configured on the plurality of nodes, wherein the information identifying the global topology is used to calculate a subnet entropy value for each of the plurality of IP subnets wherein the subnet entropy value indicates how many active VCs satisfy the connectivity requirement of each IP subnet;
- means for assigning one IP subnet of the plurality of IP subnets to one active VC of the plurality of active VCs, based upon the global topology of the network, wherein the global topology indicates that the one active VC couples all nodes that are configured with the one IP subnet, and wherein assigning the one IP subnet to the one active VC is performed according to an algorithm, and wherein the second node is also configured to assign the one IP subnet to the one active VC according to the algorithm;
- means for identifying which of the plurality of IP subnets is a most constrained IP subnet, based upon the information identifying the global topology;
- means for assigning the most constrained of the IP subnets to one of the plurality of active VCs that satisfies connectivity requirements of the most constrained one of the IP subnets; and
- means for repeating said identifying which of the plurality of IP subnets is the most constrained IP subnet and said assigning the most constrained one of the IP subnets for additional ones of the plurality of IP subnets, until all of the plurality of IP subnets are assigned.

19. The node of claim 18, wherein the network is a metro Ethernet network, and wherein the VCs are Ethernet virtual connections.

* * * * *

UNITED STATES PATENT AND TRADEMARK OFFICE
CERTIFICATE OF CORRECTION

PATENT NO.         : 8,953,486 B2                           Page 1 of 1
APPLICATION NO.    : 11/937819
DATED              : February 10, 2015
INVENTOR(S)        : Robert W. Klessig and Cedric H. Druce It is certified that error appears in the above-identified patent and that said Letters Patent is hereby corrected as shown below:

In the claims

Column 24
Line 1, in Claim 11, insert: -- first -- immediately after "A"
Line 1, in Claim 11, insert: -- of a plurality of nodes -- immediately after "node"
Line 3, in Claim 11, replace: "of a" by -- of the --
Line 7, in Claim 11, replace: "the node" by -- the first node --
Line 19, in Claim 11, replace: "the node" by -- the first node --
Line 20, in Claim 11, replace: "the node" by -- the first node --

Signed and Sealed this
Nineteenth Day of April, 2016

Michelle K. Lee
*Director of the United States Patent and Trademark Office*